(12) United States Patent
Owen et al.

(10) Patent No.: US 12,448,535 B2
(45) Date of Patent: Oct. 21, 2025

(54) COMPOSITIONS FOR WETNESS INDICATION

(71) Applicant: Chromatic Technologies, Inc., Colorado Springs, CO (US)

(72) Inventors: Timothy J. Owen, Colorado Springs, CO (US); William R. Bowers, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 18/775,522

(22) Filed: Jul. 17, 2024

(65) Prior Publication Data

US 2024/0425714 A1 Dec. 26, 2024

Related U.S. Application Data

(63) Continuation of application No. 18/213,494, filed on Jun. 23, 2023.

(51) Int. Cl.
| | |
|---|---|
| *C09D 11/50* | (2014.01) |
| *C09D 11/033* | (2014.01) |
| *C09D 11/037* | (2014.01) |
| *C09D 11/08* | (2006.01) |
| *C09D 11/103* | (2014.01) |

(Continued)

(52) U.S. Cl.
CPC ............ *C09D 11/50* (2013.01); *C09D 11/033* (2013.01); *C09D 11/037* (2013.01); *C09D 11/08* (2013.01); *C09D 11/103* (2013.01); *C09D 11/107* (2013.01); *C09D 11/328* (2013.01);

(Continued)

(58) Field of Classification Search
CPC .... G01N 31/222; C09D 11/50; C09D 11/033; C09D 11/037; C09D 11/08; C09D 11/103; C09D 11/107; C09D 11/328; C09D 11/36; C09D 11/38

See application file for complete search history.

(56) References Cited

U.S. PATENT DOCUMENTS

| | | |
|---|---|---|
| 4,022,211 A | 5/1977 | Timmons et al. |
| 5,599,335 A | 2/1997 | Goldman et al. |

(Continued)

FOREIGN PATENT DOCUMENTS

| | | |
|---|---|---|
| EP | 1447066 | 8/2004 |
| WO | WO 95/11652 | 5/1995 |

(Continued)

OTHER PUBLICATIONS

Mills, Andrew, Qing Chang, and Neil McMurray. "Equilibrium studies on colorimetric plastic film sensors for carbon dioxide." Analytical Chemistry 64.13 (1992): 1383-1389. (Year: 1992).*

(Continued)

*Primary Examiner* — Robert J Eom
(74) *Attorney, Agent, or Firm* — Craig R. Miles; CR MILES P.C.

(57) ABSTRACT

A composition, and methods of making and using such a composition, whereby the composition can include a printable ink formulation having a colorant which undergoes a visible color change upon exposure to a wetness threshold. The colorant can be highly resistant to leaching. Additionally, the colorant can be resistant to premature activation via ambient moisture or humidity.

23 Claims, 14 Drawing Sheets

(51) Int. Cl.
  *C09D 11/107* (2014.01)
  *C09D 11/328* (2014.01)
  *C09D 11/36* (2014.01)
  *C09D 11/38* (2014.01)
  *G01N 31/22* (2006.01)
(52) U.S. Cl.
  CPC .............. *C09D 11/36* (2013.01); *C09D 11/38* (2013.01); *G01N 31/222* (2013.01)

(56) References Cited

U.S. PATENT DOCUMENTS

| | | |
|---|---|---|
| 5,628,097 A | 5/1997 | Benson et al. |
| 6,096,124 A | 8/2000 | Wong et al. |
| 6,645,190 B1 | 11/2003 | Olson et al. |
| 6,761,711 B1 | 7/2004 | Fletcher et al. |
| 6,772,708 B2 | 8/2004 | Klofta et al. |
| 6,817,994 B2 | 11/2004 | Popp et al. |
| 6,840,928 B2 | 1/2005 | Datta et al. |
| 6,849,067 B2 | 2/2005 | Fletcher et al. |
| 6,893,426 B1 | 5/2005 | Popp et al. |
| 6,904,865 B2 | 6/2005 | Klofta et al. |
| 6,953,452 B2 | 10/2005 | Popp et al. |
| 6,969,377 B2 | 11/2005 | Koele et al. |
| 7,156,833 B2 | 1/2007 | Couture-Dorschner et al. |
| 7,159,532 B2 | 1/2007 | Klofta et al. |
| 7,201,744 B2 | 4/2007 | Van Gompel et al. |
| 7,497,851 B2 | 3/2009 | Koele et al. |
| 7,520,873 B2 | 4/2009 | Sosalla et al. |
| 7,682,349 B2 | 3/2010 | Popp et al. |
| 7,862,550 B2 | 1/2011 | Koele et al. |
| 7,901,393 B2 | 3/2011 | Matsuda et al. |
| 8,007,485 B2 | 8/2011 | Popp et al. |
| 8,093,447 B2 | 1/2012 | Sakaguchi |
| 8,361,048 B2 | 1/2013 | Kuen et al. |
| 8,372,052 B2 | 2/2013 | Popp et al. |
| 8,579,876 B2 | 11/2013 | Popp et al. |
| 8,703,450 B2 | 4/2014 | Bub et al. |
| 8,747,379 B2 | 6/2014 | Fletcher et al. |
| 8,754,005 B2 | 6/2014 | Gil et al. |
| 8,822,753 B2 | 9/2014 | Shiraishi et al. |
| 9,034,090 B2 | 5/2015 | Kozee et al. |
| 9,084,838 B2 | 7/2015 | Song et al. |
| 9,169,366 B2 | 10/2015 | Weisman et al. |
| 9,220,640 B2 | 12/2015 | Ales et al. |
| 9,320,824 B2 | 4/2016 | Klofta et al. |
| 9,421,137 B2 | 8/2016 | LaVon et al. |
| 9,498,389 B2 | 11/2016 | Trennepohl et al. |
| 9,554,948 B2 | 1/2017 | Song et al. |
| 9,630,901 B2 | 4/2017 | Godlewski et al. |
| 9,822,197 B2 | 11/2017 | Hörner et al. |
| 10,383,972 B2 | 8/2019 | Gu et al. |
| 10,568,779 B2 | 2/2020 | Joseph et al. |
| 10,695,231 B2 | 6/2020 | Liu |
| 2003/0164136 A1 | 9/2003 | Klofta et al. |
| 2005/0199177 A1 | 9/2005 | Klofta et al. |
| 2006/0024433 A1 | 2/2006 | Blessing et al. |
| 2007/0219521 A1 | 9/2007 | Hird et al. |
| 2008/0312617 A1 | 12/2008 | Hundorf et al. |
| 2008/0312622 A1 | 12/2008 | Hundorf et al. |
| 2010/0051166 A1 | 3/2010 | Hundorf et al. |
| 2011/0012954 A1 | 1/2011 | Brown et al. |
| 2011/0137274 A1 | 6/2011 | Klofta et al. |
| 2011/0139657 A1 | 6/2011 | Hird et al. |
| 2011/0139658 A1 | 6/2011 | Hird et al. |
| 2011/0152812 A1 | 6/2011 | Hird et al. |
| 2011/0250626 A1* | 10/2011 | Williams ............. C12Q 1/34 106/4 |
| 2012/0035563 A1 | 2/2012 | Ruman et al. |
| 2012/0312491 A1 | 12/2012 | Jackels et al. |
| 2013/0158492 A1 | 6/2013 | Song et al. |
| 2013/0211363 A1 | 8/2013 | LaVon et al. |
| 2014/0005020 A1 | 1/2014 | LaVon et al. |
| 2014/0088530 A1 | 3/2014 | Klofta et al. |
| 2014/0088531 A1 | 3/2014 | Klofta et al. |
| 2015/0094676 A1 | 4/2015 | Klofta |
| 2015/0166806 A1 | 6/2015 | Kozee et al. |
| 2015/0173968 A1 | 6/2015 | Joseph |
| 2016/0038628 A1 | 2/2016 | Klofta et al. |
| 2016/0051419 A1 | 2/2016 | Wasson et al. |
| 2016/0136014 A1 | 5/2016 | Arora et al. |
| 2016/0177117 A1 | 6/2016 | Brown et al. |
| 2016/0206774 A1 | 7/2016 | Hird |
| 2017/0003257 A1 | 1/2017 | Klofta et al. |
| 2019/0192723 A1 | 6/2019 | Weisman et al. |
| 2019/0270902 A1 | 9/2019 | Shimamura |
| 2021/0393449 A1 | 12/2021 | Grenier et al. |
| 2022/0047430 A1 | 2/2022 | Luck |
| 2023/0414416 A1 | 12/2023 | Vetter et al. |
| 2023/0416551 A1 | 12/2023 | Owen et al. |

FOREIGN PATENT DOCUMENTS

| | | |
|---|---|---|
| WO | WO 2012/052172 | 4/2012 |
| WO | WO 2012/170778 | 12/2012 |
| WO | WO 2019/161190 A1 | 8/2019 |
| WO | WO 2023/250479 A1 | 12/2023 |

OTHER PUBLICATIONS

Bureš. Quaternary Ammonium Compounds: Simple in Structure, Complex in Application. Topics in Current Chemistry, 2019 (printed online May 2019), 377(3):14.

PCT International Patent Application No. PCT/US23/26211, International Search Report and Written Opinion of the International Searching Authority mailed Jan. 4, 2024, 22 pages.

PCT International Patent Application No. PCT/US23/68980, International Search Report and Written Opinion of the International Searching Authority mailed Dec. 10, 2023, 7 pages.

PCT International Patent Application No. PCT/US24/35281, International Search Report and Written Opinion of the International Searching Authority mailed Nov. 7, 2024, 33 pages.

U.S. Appl. No. 18/213,401, Office Action mailed Jul. 15, 2025.

* cited by examiner

COMPOSITIONS FOR WETNESS INDICATION

This United States Patent Application is a continuation of U.S. patent application Ser. No. 18/213,494, filed Jun. 23, 2023, hereby incorporated by reference herein.

I. SUMMARY OF THE INVENTION

A broad object of a particular embodiment of the present invention can be to provide a composition, and methods of making and using such a composition, whereby the composition can include a printable ink formulation having a colorant which undergoes a visible color change upon exposure to a preselected wetness threshold. The colorant can be highly resistant to leaching from a substrate. Additionally, the colorant can be resistant to premature activation via ambient moisture or humidity.

Naturally, further objects of the invention are disclosed throughout other areas of the specification, drawings, and claims.

II. A BRIEF DESCRIPTION OF THE DRAWINGS

III. DETAILED DESCRIPTION OF THE PREFERRED EMBODIMENTS

Composition

Figure 1:
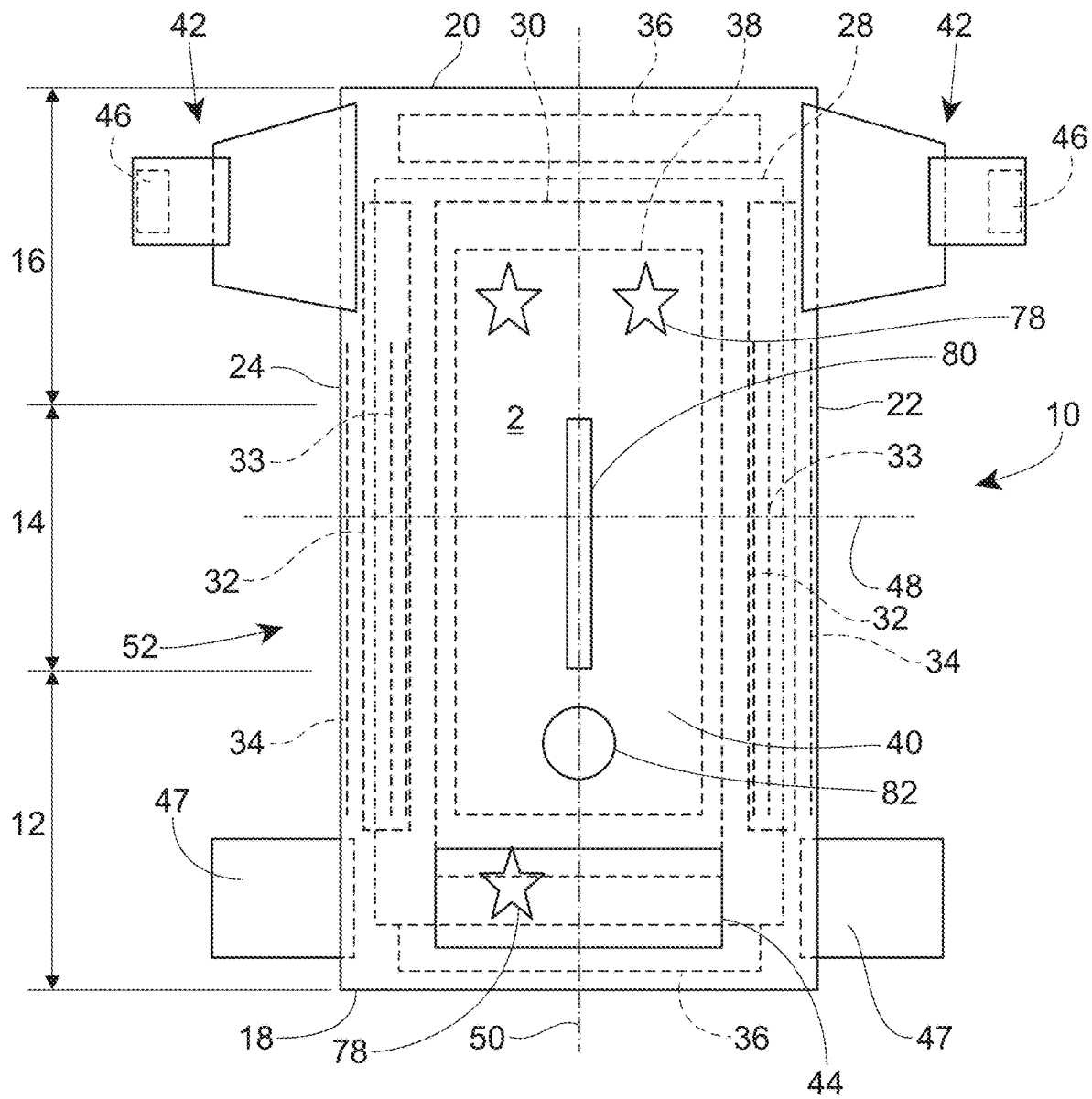
FIG. 1 is a plan view of an example absorbent article in the form of a taped diaper, garment-facing surface facing the viewer, in a flat laid-out state.

The present invention is directed to a composition operative to provide an indication of exposure to a preselected wetness threshold, whereby the composition includes a colorant which undergoes a visible color change upon exposure to the wetness threshold. The visible color change can be visually observed (for example by a human, i.e. human-readable) or detected (for example by a human, i.e. human-readable, or a machine, i.e. machine-readable).

As used herein, the term "preselected" can mean predetermined or decided in advance.

As used herein, the term "threshold" can mean the point which must be reached or exceeded for a certain phenomenon to occur or be manifested.

As used herein, the term "colorant" can refer to a substance that can color something, whereby the substance may be a dye, pigment, etc.

As used herein, the term "color change" in reference to a colorant can mean that the colorant may change in appearance, change in color (for example, yellow to blue, etc.), appear, disappear, or change in intensity or visual distinctiveness.

As used herein, the term "detect" and forms thereof can mean to discover or ascertain the presence of.

As used herein, the term "leach" in reference to a substance can mean to move within or to come out of or to be removed from or to be pulled out of another substance, for example by a fluid and/or a liquid.

As used herein, the term "room temperature" can mean a temperature in the range of between about 20° C. and about 25° C. As to particular embodiments of the present invention, ink can be at room temperature when printed on a substrate via a printer.

The present composition can be a formulation comprising multiple components. In particular, the composition can be an ink formulation, whereby the term "ink" can refer to a colored liquid material, typically used for writing, drawing, and/or printing. Specifically, the composition can be a printable ink formulation, meaning the ink can be formulated for printing on a substrate via a printer. Correspondingly, in addition to the colorant, the printable ink formulation can include one more volatile solvents and one or more resins, whereby upon printing, the solvent(s) evaporates and the resin(s) functions as a binder to facilitate adhesion of the colorant to the substrate.

As to particular embodiments, the present composition can be used in conjunction with a wearable article, including but not limited to an absorbent article (10). For example, caregivers frequently desire to know whether urine is present in an absorbent article (10), such as a diaper, and/or how much urine is present. This may be due to skin health/containment concerns (e.g., whether the absorbent article (10) contains sufficient urine to warrant changing), or health concerns (e.g., whether the wearer is getting enough fluid). The presence of urine may be signaled to the caregiver as a color change detectable in at least a portion of the absorbent article (10) and visible prior to removal of the absorbent article (10) (for example visible on a garment-facing surface (2) of the absorbent article (10)) by a urine indicator, which can serve as a surrogate for a wetness indicator (80). Following, a pH-sensitive colorant which undergoes a visible color change when wetted with urine may be used for this application.

One approach employing such a colorant may be to formulate a hot melt adhesive containing a small quantity of a pH-sensitive colorant, whereby such a urine indicator may be known as a hot melt wetness indicator (HMWI). For example, U.S. Pat. No. 6,772,708 (hereinafter "U.S. Pat. No. 6,772,708") describes such an indicator disposed in a "carrier matrix," whereby the carrier matrix is detailed as "a quantity of a material or materials serving to hold or retain the wetness indicator (1) in the desired position within the product, such that urine will come into contact with it and such that a physical change in the wetness indicator (1), such as a change in color, will be sensible to the wearer or a caregiver." Column 4, Lines 32-38. Notably, the HMWIs taught in U.S. Pat. No. 6,772,708 mandate a "carrier matrix" that is solid at room temperature (having a melting point above room temperature). For the three disclosed formulas (Formula 1, Formula 2, and Formula 3) that are examples of compositions of the invention of U.S. Pat. No. 6,772,708, each includes a carrier matrix comprised of (i) a fatty alcohol (stearyl alcohol) and (ii) a wax (microcrystalline wax). The stearyl alcohol is "a white waxy solid with a purity of at least 97% and such a stearyl alcohol may have no more than 2% of arachidyl alcohol, and may possess a melt point of 56-60° C." Column 17, Lines 60-64; Column 18, Lines 59-63; and Column 19, Lines 54-57. The microcrystalline wax is "a high molecular weight petroleum based wax consisting of saturated branched and cyclic non-polar hydrocarbons and such a wax may have a melting point in the range of 60-95° C." Column 17, Line 66 through Column 18, Line 3; Column 18, Line 65 59 through Column 19, Line 2; and Column 19, Lines 60-64.

Regarding known compositions for wetness indication, including HMWIs, an issue in the art is the tendency of the pH-sensitive colorant to leach from (diffuse out of) the carrier matrix; in particular, excess urine may cause the colorant to leach from the carrier matrix and migrate toward and possibly through a topsheet (26) and/or backsheet (28) of the absorbent article (10). This may lead to consumer negatives such as clothing or bedding staining, and/or may cause the composition to appear unsightly through the backsheet (28), i.e., the applied image comprised of the composition may become blurry, indistinct, or otherwise aesthetically displeasing. Thus, a composition resistant to leaching of the colorant, such as upon exposure to urine, may be highly desirable to minimize concerns related to colorant migration within, or out of, the absorbent article (10).

Hence, it is an object of the present invention to provide a composition for wetness indication which can function as a urine indicator and thus, be configured as a pH indicator operative to provide an indication of exposure to a preselected pH threshold, whereby the composition includes a pH-sensitive colorant which undergoes a visible color change upon exposure to the pH threshold. The pH-sensitive colorant can be highly resistant to leaching and can also be resistant to premature activation via ambient moisture or humidity, which may render the composition less effective in detecting and/or indicating the presence of urine, and correspondingly wetness, in an absorbent article (10). Additionally, a preferable composition may have excellent signal clarity and kinetics, i.e., the signal may be visible relatively soon after contact with urine.

As stated above, the present composition can be coupled to (such as disposed on and/or in) a substrate, whereby said substrate can facilitate incorporation of the composition into a product, such as an absorbent article (10) or a component thereof. To reiterate, following activation by an activating liquid such as urine, the colorant can be precluded from leaching out of the substrate.

Also as stated above, the present composition can be a printable ink formulation, meaning the ink can be formulated for printing on a substrate via a printer. As to particular embodiments, the substrate can comprise film, nonwoven, woven, or foam material, or combinations thereof (such as laminates of film and nonwoven material) and may comprise synthetic and/or natural materials, as well as processed natural materials (such as regenerated cellulose). The substrate can be transparent, semi-transparent, translucent, or opaque. As to particular embodiments, the substrate can comprise a semi-translucent film. As but one illustrative and non-limiting example, the substrate can comprise polyolefin film, or the like. As but another illustrative and non-limiting example, the substrate can comprise low-density polyethylene (LDPE) film, or the like.

Of note, it has been found that in accordance with the present invention, as to particular embodiments, the surface area (or film topology) of the substrate can affect (i) the rate of the color change reaction and/or (ii) the color density. For example, a substrate having a greater surface area, for example as a result of having a greater surface texture, may facilitate an increased (i) rate of the color change reaction and/or (ii) color density relative to a substrate having a lesser surface area, for example as a result of having a smooth surface.

For printing on a substrate via a printer, as to particular embodiments, the present composition can be formulated as a flexographic ink for printing via a flexographic press (nonlimiting examples include Evo XG flexo press series from Koenig & Bauer; Megaflex inline wide web flexo printing press from KYMC (Kuen Yuh Machinery Engineering Co., Ltd.); Fox-Series flexo presses from Retroflex, Incorporated; NOVOFLEX flexographic printing machine from Windmöller & Hölscher Corporation; or the like). As to particular embodiments, the flexographic ink can be specifically formulated for high-speed printing, for example whereby the printing can be at a speed of around 1,000 to 2,000 feet/minute. As to particular embodiments, the flexographic ink can be formulated for printing at a speed of at least about 1,000 feet/minute. As to particular embodiments, the flexographic ink can be formulated for printing at a speed of at least about 1,250 feet/minute. As to particular embodiments, the flexographic ink can be formulated for printing at a speed of at least about 1,500 feet/minute. As to particular embodiments, the flexographic ink can be formulated for printing at a speed of at least about 1,750 feet/minute. As to particular embodiments, the flexographic ink can be formulated for printing at a speed of at least about 2,000 feet/minute. As to particular embodiments, the flexographic ink can be formulated for printing at a speed of between about 1,000 feet/minute and about 5,000 feet/minute, between about 1,000 feet/minute and about 4,000 feet/minute, or between about 1,200 feet/minute and about 3,500 feet/minute, specifically reciting all values within these ranges and any ranges formed therein or thereby. As to particular embodiments, following printing, the dry film can have a thickness of about 4-8 microns, which can be in stark contrast to the thickness of a HMWI which may be about 25-50 microns.

For printing on a substrate via a printer, as to particular embodiments, the present composition can be formulated as a gravure ink for printing via a rotogravure printing press (nonlimiting examples include Euroflex-812 rotogravure printing press from Koenig & Bauer; MD Series rotogravure printing machines from FUJI KIKAI KOGYO Co. Ltd; FMD Series rotogravure printing machines from FUJI KIKAI KOGYO Co. Ltd; FSR Series rotogravure printing machines from FUJI KIKAI KOGYO Co. Ltd; or the like). As to particular embodiments, the gravure ink can be specifically formulated for high-speed printing, for example whereby the printing can be at a speed of around 1,000 to 2,000 feet/minute. As to particular embodiments, the gravure ink can be formulated for printing at a speed of at least about 1,000 feet/minute. As to particular embodiments, the gravure ink can be formulated for printing at a speed of at least about 1,250 feet/minute. As to particular embodiments, the gravure ink can be formulated for printing at a speed of at least about 1,500 feet/minute. As to particular embodiments, the gravure ink can be formulated for printing at a speed of at least about 1,750 feet/minute. As to particular embodiments, the gravure ink can be formulated for printing at a speed of at least about 2,000 feet/minute. As to particular embodiments, the gravure ink can be formulated for printing at a speed of between about 1,000 feet/minute and about 5,000 feet/minute, between about 1,000 feet/minute and about 4,000 feet/minute, or between about 1,200 feet/minute and about 3,500 feet/minute, specifically reciting all values within these ranges and any ranges formed therein or thereby. As to particular embodiments, following printing, the dry film can have a thickness of about 4-8 microns, which can be in stark contrast to the thickness of a HMWI which may be about 25-50 microns.

For printing on a substrate via a printer, as to particular embodiments, the present composition can be formulated as a digital printing ink for printing via a digital printing process.

For printing on a substrate via a printer, as to particular embodiments, the present composition can be formulated as an ink for printing via an inkjet printer.

As to particular embodiments, the present composition can be applied to a substrate by a continuous inkjet printing process as an integrated step of an absorbent article (10) manufacturing (converting) process, such as a diaper manufacturing (converting) process.

For printing on a substrate via a printer, as to particular embodiments, the present composition can be formulated as an ink for printing via a laser printer.

In another form, the present composition may be applied to a substrate by a slot coating process.

For application to a substrate by the various printing techniques described herein, in addition to comprising (i) a liquid state at room temperature and (ii) a relatively low viscosity, as to particular embodiments, the present composition can have a glass transition temperature (Tg) of not greater than about 150° C., or not greater than about 100° C.

In contrast to the present composition configured as a printable ink formulation, HMWIs are typically coupled to an absorbent article (10), such as a diaper, as a strip via a slot-die coater, which applies the indicator in a molten liquid state down the center of the diaper as a relatively thick film, which may have an exemplary width of around 0.25 inches and a length of around eight inches.

Now regarding constituents, as stated above, the present composition comprises a colorant, whereby the colorant can have a first color state which may be associated with a first state of the composition. Examples of the first color state can include, but are not limited to, colors visible to the human eye, such as red, orange, yellow, green, blue, indigo, violet, purple, black, white, or the like; colors not visible to the human eye, such as colors in the ultraviolet (UV) or infrared (IR) portions of the electromagnetic spectrum; or the like. The first color state can be transparent, translucent, or opaque. As to particular embodiments, the first color state of the composition may be the same, or a similar, color as the substrate and/or component of the absorbent article (10) on which it is applied. For example, the first color state of the composition may be white and may be applied to a white-colored substrate and/or component of the absorbent article (10).

The first state of the composition can be associated with, but is not limited to, a preselected pH threshold, a specific pH, or a specific pH range. Additionally, it is herein contemplated that the first state of the composition can be associated with other parameters, for example the absence or presence of a specific composition or compound, such as water, urine, blood, urea, dissolved oxygen, ions (such as, but not limited to, iron, calcium, sodium, chloride, etc.), sugars (such as glucose, etc.), enzymes, or the like; microbiological flora and fauna, such as bacteria, or the like; or combinations thereof.

The colorant can have a second color state which may be associated with a second state of the composition. Examples of the second color state can include, but are not limited to, colors visible to the human eye, such as red, orange, yellow, green, blue, indigo, violet, purple, black, white, or the like; colors not visible to the human eye, such as colors in the ultraviolet (UV) or infrared (IR) portions of the electromagnetic spectrum; or the like. The second color state can be transparent, translucent, or opaque. Significantly, the second color state can be visibly different from the first color state, having a change in appearance, color, intensity, and/or visual distinctiveness. As to particular embodiments, the first color state may be a first color, such as yellow, and the second color state may be a second color, such as blue. As to other particular embodiments, the first color state may be a first color, such as red, and the second color state may be transparent. As to other particular embodiments, the first color state may be transparent, and the second color state may be a first color, such as red.

The second state of the composition can be associated with, but is not limited to, a preselected pH threshold, a specific pH, or a specific pH range. Additionally, it is herein contemplated that the second state of the composition can be associated with other parameters, for example the absence or presence of a specific composition or compound, such as water, urine, blood, urea, dissolved oxygen, ions (such as, but not limited to, iron, calcium, sodium, chloride, etc.), sugars (such as glucose, etc.), enzymes, or the like; microbiological flora and fauna, such as bacteria, or the like; or combinations thereof.

As to particular embodiments, the color change of the colorant from the first color state to the second color state resulting from exposure to the wetness threshold can be an irreversible color change or permanent color change, as opposed to a reversible color change. Thus, the present composition can have a color-memory property whereby after the second color state is achieved following exposure to the wetness threshold, the second color state can be retained even upon discontinuation of exposure to the wetness threshold or conditions associated with exposure to the wetness threshold to effectively record exposure to the wetness threshold. As to particular embodiments, the color change of the colorant from the first color state to the second color state can occur within about 1 minute, within about 2 minutes, within about 3 minutes, within about 4 minutes, or within about 5 minutes following exposure to the wetness threshold.

As to particular embodiments of the present composition configured as a pH indicator, the first state of the composition can be associated with a preselected pH threshold, a specific pH, or a specific pH range, and the second state of the composition can be associated with a preselected pH threshold, a specific pH, or a specific pH range that is different from that of the first state. As to particular embodiments, the second state of the composition can be associated with the pH or pH range of urine, for example human urine, which may typically be about 5.5 to about 8.0 (as measured as a neat solution at human body temperature (typically about 37.6° C.)); correspondingly, the first state of the composition may be associated with a specific pH or pH range which is different from that associated with the second state, such as more acidic or more basic, for example, a pH of less than about 5.5 or greater than about 8.0, respectively.

Regarding embodiments of the present composition configured as a pH indicator and accordingly including a pH-sensitive colorant, as to particular embodiments, said colorant can be neutral in charge and lightly colored at acidic pHs. As to particular embodiments, the sulfonephthalein class of pH-sensitive colorants may be useful with the present invention; in an acidic state, these colorants can have such a neutral charge and may typically be yellow in color, whereby the neutral charge of the colorant can enhance its solubility in hydrophobic media. Upon contact with an activating liquid such as urine having a pH higher than its $pK_a$, such a colorant can be "activated" and undergo a charge and associated color change; for example, colorants of the sulfonephthalein class can change to a blue-green color and have an anionic charge (which, significantly, can allow the colorant to be scavenged by a cationic compound). Non-limiting examples of suitable sulfonephthalein colorants can include bromocresol green, m-cresol purple, cresol red, chlorophenol red, bromothymol blue, bromopyrogallol red, bromoxylenol blue, bromophenol blue, or the like. Regarding the latter, bromophenol blue can change from a yellow neutral state to a blue anionic state at a pH greater than its $pK_a$ of approximately 4.0. As another example, bromocresol green can change from a yellow neutral state to a blue anionic state at a pH greater than its $pK_a$ of approximately 4.7.

Other examples of pH-sensitive colorants which can be neutral in their acidic state and anionic after contact with urine can include monoazo dyes, such as acid alizarin violet N; monoazo pyrazolone dyes, such as acid yellow 34; diazo dyes, such as acid black 24; acid anthraquinone dyes, such as acid black 48 and alizarin complexone dihydrate; amphoteric anthraquinone dyes, such as acid blue 45; triphenylmethane dyes, such as acid fuchsin; phthalein type dyes, such as o-cresolphthalein; xanthene dyes, such as 2',7'-dichlorofluorescein and eosin B; or the like.

As to particular embodiments, the present composition can comprise two or more colorants. As to particular embodiments, the first and second color states of the colorants can be different and/or the corresponding first and second states of the associated compositions can be different. As illustrative examples, colorants can vary in color, $pK_a$, etc.

As to particular embodiments, different colorants can facilitate interactive scenes, sequences, or displays providing information regarding relative fullness/wetness of the absorbent article (10), or merely provide entertainment and/or aesthetic value.

Regarding coupling to a substrate, the above-described pH-sensitive colorants can be printed on the substrate in their neutral state, whereby the neutral charge of the colorant can allow it to be more easily solubilized in a hydrophobic medium. Upon contact with urine having a pH above its $pK_a$, the charge of the colorant can change from neutral to anionic, whereby this negative charge of the colorant can not only cause the colorant to change color (for example, from yellow to blue), but the more polar nature of the anion can also enhance the solubility of the colorant in an aqueous medium, such as urine, which can result in leaching of the colorant, for example diffusion of the colorant within the substrate or out of the substrate.

Following, as to particular embodiments of the present invention, the pH-sensitive colorant, when in its second color state, can be chemically bound to a leaching inhibitor (or colorant fastener), whereby a chemical bond can include a covalent bond, an ionic bond, a metallic bond, or combinations thereof. Upon forming such a bond, for example an ionic bond, the leaching inhibitor can function to immobilize the colorant relative to the substrate when the colorant is in its second color state. When it its first color state, the colorant may not be bound to the leaching inhibitor, for example due to a lack of ionic attractive forces therebetween.

As to particular embodiments, the leaching inhibitor can comprise a cationic molecule, such as a permanently charged cationic molecule, which can associate with the activated anionic form of the pH-sensitive colorant to reduce or completely inhibit leaching of the colorant from the substrate, for example in the presence of urine.

As to particular embodiments, the leaching inhibitor can comprise a quaternary ammonium compound ($R_4N^+$, QAC, or quat). Without wishing to be bound by theory, it is thought that the cationic quaternary ammonium compound can form an ionically bonded complex with the anionic pH-sensitive colorant due to the strong coulombic interaction between the anionic colorant and the cationic quaternary ammonium compound. Formation of the complex can neutralize the charge of both the anionic colorant and the cationic quaternary ammonium compound, which may dramatically reduce the solubility of the complex in hydrophilic or polar media such as urine, thereby significantly reducing or completely inhibiting leaching of the colorant from the substrate and correspondingly "locking" the colorant to the substrate. As to particular embodiments, the complex formed from the anionic colorant and the cationic quaternary ammonium compound can be substantially insoluble or insoluble in hydrophilic or polar media such as urine. As to particular embodiments, a clearer, more distinct, and/or more intricate applied image comprised of the composition may be achieved in embodiments having the colorant "locked" to the substrate, as colorant diffusion can cause the applied image to appear blurry, indistinct, or otherwise aesthetically displeasing.

Exemplary quaternary ammonium compounds which may be useful with the present composition can comprise, consist essentially of, or consist of ammonium hydroxides, ammonium fluorides, ammonium chlorides, ammonium bromides, ammonium iodides, other ammonium salts, or the like, or combinations thereof.

As to particular embodiments, quaternary ammonium compounds and salts thereof which may be useful with the present composition can include those having the following formula:

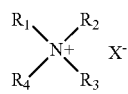

wherein each of $R_1$, $R_2$, $R_3$ and $R_4$ is independently selected from an alkyl group of from 1 to 30 carbon atoms or an aromatic, alkoxy, polyoxyalkylene, alkylamido, hydroxyalkyl, aryl, or alkylaryl group having up to about 30 carbon atoms; and $X^-$ is a salt-forming anion such as those selected from a halogen (e.g. chloride, bromide), acetate, citrate, lactate, glycolate, phosphate, nitrate, sulfonate, sulfate, alkylsulfate, and alkyl sulfonate radicals. The alkyl groups can contain, in addition to carbon and hydrogen atoms, ether and/or ester linkages, and other groups such as amino groups. The longer chain alkyl groups, e.g., those of about 12 carbons or more, can be saturated or unsaturated.

As to particular embodiments, dialkyl dimethyl ammonium quaternary compounds may be effective in reducing or completely inhibiting the leaching of anionic pH-sensitive colorants from a substrate. Suitable examples can include dicocoalkyl dimethyl ammonium chloride, di(hydrogenated tallowalkyl) dimethyl ammonium chloride, distearyl dimethyl ammonium chloride, (2-ethylhexyl)(hydrogenated tallowalkyl) dimethyl ammonium sulfate, or the like. As to particular embodiments, alkyl trimethyl ammonium chlorides may function as leaching inhibitors, whereby examples can include dodecyl trimethyl ammonium chloride, hexadecyl trimethyl ammonium methylsulfate, octadecyl trimethyl ammonium chloride, or the like. As to particular embodiments, other classes of cationic quaternary ammonium compounds that can act as leaching inhibitors may include the imidazoline quaternary class, the mono-, di-, tri- and tetra-amidoamine quaternary class, the mono-, di-, tri- and tetra-benzyl quaternary class, the benzylalkyl quaternary class, the diquaternary class, the ethoxylated quaternary class, or the like. It should be noted that the counter anion used in neutralization of the cationic compound may not be specifically limited to chloride; other anions can also be employed, and non-limiting examples may include bromide, methyl sulfate, nitrite, or the like.

As to particular embodiments, the mono-, di-, tri- and tetra-alkyl class of quaternary ammonium compounds may be especially effective in reducing or completely inhibiting leaching of anionic pH-sensitive colorants from the substrate. As to particular embodiments of this class, compounds having a greater number of carbon (C) atoms may be preferable, such as tetraoctyl ammonium bromide, didodecyl dimethyl ammonium chloride, dimethyl dioctadecyl ammonium chloride, tetrapentyl ammonium chloride, tetrabutyl ammonium chloride, tetradodecyl ammonium bromide, benzyldimethyl hexadecyl ammonium chloride, hexadecyl trimethyl ammonium chloride, tetraheptyl ammonium bromide, or the like.

Of note, it has been found that in accordance with the present invention, as to particular embodiments, quaternary ammonium compounds having a greater number of carbon (C) atoms may be particularly preferable for the present composition, and specifically for the present printable ink formulation, due to their compatibility with not only the colorant but also with the volatile solvent(s) and resin(s) required to formulate an ink which can be printed on a substrate via a printer. Additionally, quaternary ammonium compounds having a greater number of carbon (C) atoms can have a relatively greater molecular size relative to compounds having a lesser number of carbon (C) atoms which may, without wishing to be bound by theory, serve to diffuse the positive charge of the cationic quaternary ammonium compound, whereby such a diffuse positive charge can facilitate association with the activated anionic form of the pH-sensitive colorant which, as described above, can reduce or completely inhibit leaching of the colorant from the substrate. As but one illustrative example, a tetraoctyl quaternary ammonium compound may be preferable for the present composition over a tetrabutyl quaternary ammonium compound, as the former has a greater number of carbon (C) atoms and correspondingly a greater molecular size relative to the latter, as shown below (note that the counter anions are not shown):

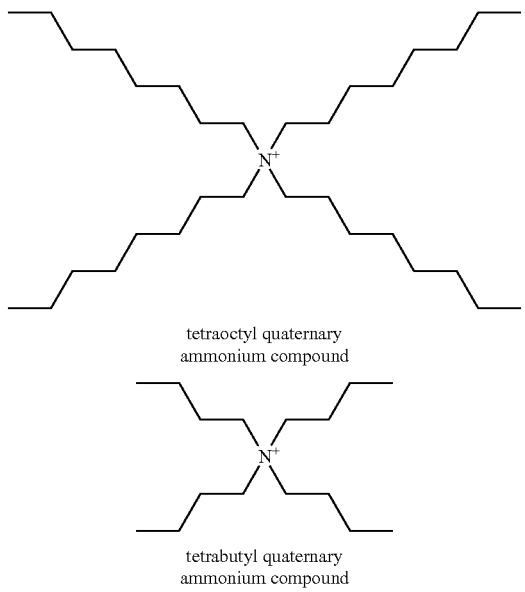

tetraoctyl quaternary ammonium compound tetrabutyl quaternary ammonium compound

Also of note, it has been found that in accordance with the present invention, as to particular embodiments, quaternary ammonium compounds which may be useful with the present composition can have a molecular weight similar to the molecular weight of the colorant. As to particular embodiments, quaternary ammonium compounds which may be useful with the present composition can have a molecular weight which is not greater than about 30 percent different (whether 30% less or 30% more) from the molecular weight of the colorant. As to particular embodiments, quaternary ammonium compounds which may be useful with the present composition can have a molecular weight which is not greater than about 25 percent different (whether 25% less or 25% more) from the molecular weight of the colorant. As to particular embodiments, quaternary ammonium compounds which may be useful with the present composition can have a molecular weight which is not greater than about 20 percent different (whether 20% less or 20% more) from the molecular weight of the colorant. As to particular embodiments, quaternary ammonium compounds which may be useful with the present composition can have a molecular weight which is not greater than about 15 percent different (whether 15% less or 15% more) from the molecular weight of the colorant. As to particular embodiments, quaternary ammonium compounds which may be useful with the present composition can have a molecular weight which is not greater than about 10 percent different (whether 10% less or 10% more) from the molecular weight of the colorant. As but one illustrative example (shown below), tetraoctyl ammonium bromide (quaternary ammonium compound) has a molecular weight of 546.79 g/mol and bromophenol blue (colorant) has a molecular weight of 669.96 g/mol; correspondingly, the former has a molecular weight which is 18.4% less than the molecular weight of the latter.

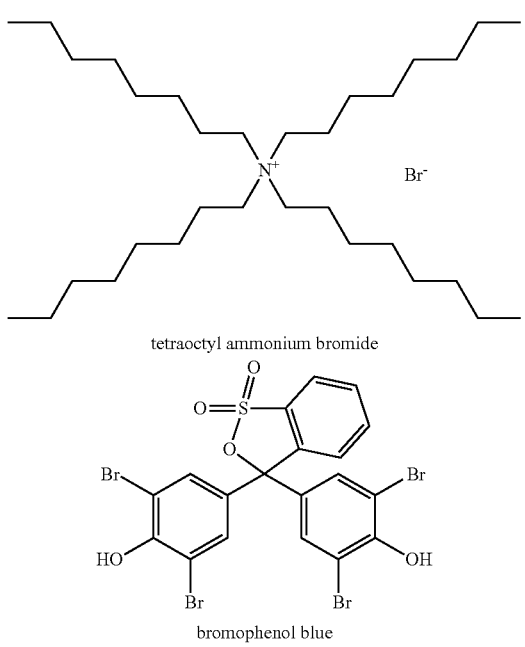

tetraoctyl ammonium bromide bromophenol blue

Also of note, it has been found that in accordance with the present invention, as to particular embodiments, a relatively low molar ratio of leaching inhibitor (for example, quaternary ammonium compound):colorant (for example, pH-sensitive colorant) can be effective to reduce or completely inhibit leaching of the colorant from the substrate, whereby illustrative examples of such a ratio can include about 1:1, about 1:2, about 2:1, about 2:3, about 3:1, about 3:2, about 3:4, about 4:1, about 4:3, or the like. As to particular embodiments, the molar ratio of leaching inhibitor (for example, quaternary ammonium compound):colorant (for example, pH-sensitive colorant) can be between about 1:1 and about 4:1, between about 1:1 and about 3:1, between about 1:1 and about 2.75:1, between about 1:1 and about 2.3:1, between about 1:1 and about 2:1, between about 1:1 and about 1.75:1, between about 2:1 and about 4:1, between about 2:1 and about 3:1, and between about 3:1 and about 4:1, specifically reciting all values within these ranges and any ranges formed therein or thereby. As to particular embodiments, the molar ratio of leaching inhibitor (for example, quaternary ammonium compound):colorant (for example, pH-sensitive colorant) can be between about 1:1 and about 3:1, between about 1:1 and about 2.65:1, between about 1:1 and about 2.3:1, between about 1:1 and about 2:1, or between about 1:1 and about 1.75:1, specifically reciting all values within these ranges and any ranges formed therein or thereby. As to particular embodiments, the present composition can comprise or consist of about equimolar amounts of leaching inhibitor (for example, quaternary ammonium compound) and colorant (for example, pH-sensitive colorant).

Also of note, it has been found that in accordance with the present invention, as to particular embodiments, an excess amount of leaching inhibitor (for example, quaternary ammonium compound) in the present composition can be detrimental to its usage as a printable ink formulation having a colorant which undergoes a visible color change upon exposure to a preselected wetness threshold. For example, as the quaternary ammonium compound can be inherently hygroscopic, an excess amount of the quaternary ammonium compound can tend to absorb moisture, such as from the air, which can lead to undesired premature activation of the colorant, thus compromising the ability of the composition to act as a urine indicator. As but one illustrative example, an excess amount of quaternary ammonium compound can be a molar ratio of leaching inhibitor (for example, quaternary ammonium compound):colorant (for example, pH-sensitive colorant) greater than about 5:1. As but another illustrative example, an excess amount of quaternary ammonium compound can be a molar ratio of leaching inhibitor (for example, quaternary ammonium compound): colorant (for example, pH-sensitive colorant) greater than about 10:1. As but another illustrative example, an excess amount of quaternary ammonium compound can be a molar ratio of leaching inhibitor (for example, quaternary ammonium compound):colorant (for example, pH-sensitive colorant) greater than about 15:1. As but another illustrative example, an excess amount of quaternary ammonium compound can be a molar ratio of leaching inhibitor (for example, quaternary ammonium compound): colorant (for example, pH-sensitive colorant) greater than about 20:1. As but another illustrative example, an excess amount of quaternary ammonium compound can be a molar ratio of leaching inhibitor (for example, quaternary ammonium compound): colorant (for example, pH-sensitive colorant) greater than about 25:1. As but another illustrative example, an excess amount of quaternary ammonium compound can be a molar ratio of leaching inhibitor (for example, quaternary ammonium compound):colorant (for example, pH-sensitive colorant) greater than about 30:1.

Following, it may be desirable to limit the ratio of leaching inhibitor (for example, quaternary ammonium compound):colorant (for example, pH-sensitive colorant) in order to provide the leaching inhibition benefit while limiting or preventing the potential for premature activation of the colorant. Correspondingly, as to particular embodiments, the present composition may have a molar ratio of leaching inhibitor (for example, quaternary ammonium compound): colorant (for example, pH-sensitive colorant) of less than about 15:1, less than about 12:1, less than about 10:1, less than about 8:1, or less than about 5:1.

Also of note, it has been found that in accordance with the present invention, as to particular embodiments, quaternary ammonium compounds which may be useful with the present composition can have greater symmetry relative to compounds having lesser symmetry. As but one illustrative example, a tetraoctyl quaternary ammonium compound may have greater symmetry than a didodecyl dimethyl quaternary ammonium compound or a cetyltrimethyl quaternary ammonium compound, as shown below (note that the counter anions are not shown):

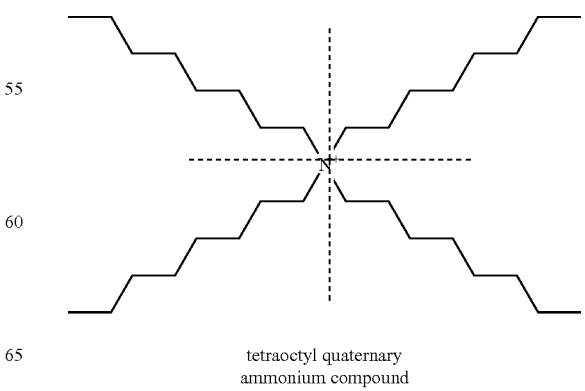

tetraoctyl quaternary
ammonium compound

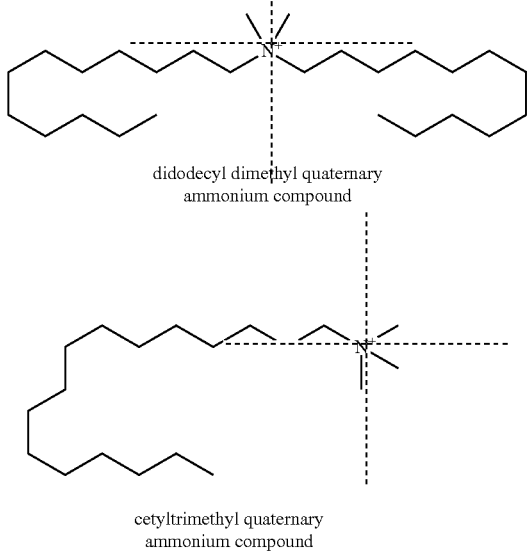

didodecyl dimethyl quaternary ammonium compound cetyltrimethyl quaternary ammonium compound As to particular embodiments, other cationic materials that may be useful in reducing or completely inhibiting leaching of anionic pH-sensitive colorants from the substrate can include amine acid salts, polyacryamidopropyltrimmonium chloride, PEG-2 dimeadowfoamamidoethylmonium methosulfate, meadowfoam glyceryl quaternium, alkyl betaines, alkyl amido betaines, imidazolinium betaines, sulfobetaines, quaternized poly(vinylpyridine), amidoamine acid salts, poly(imine) acid salts, polyethylene imine acid salts, cationic polyacryamides, poly(vinylamine) acid salts, cationic ionene polymers, poly(vinylbenzyl onium salts), poly(vinylimidazolinium salts), quaternized silicone compounds such as the diquaternary polydimethylsiloxanes, poly(vinyl alcohol) quaternary materials, cationic guars, polydimethyl diallylammonium chloride, cationic and anionic exchange resins and polymers, copolymers of vinylpyrrolidone and methyacrylamidopropyltrimethylammonium chloride, acidified polyvinylpyrrolidones, acidified polyvinylpolypyrrolidones, acidified copolymers of vinylpyrrolidone and vinylacetate, acidified copolymers of vinylpyrrolidone and dimethylaminoethylmetacrylate, copolymers of vinylpyrrolidone and methacrylamidopropyl trimethlyammonium chloride, copolymers of quaternized vinylpyrrolidone and dimethylaminoethylmethacrylate, acidified vinylcaprolactam based polymers, acidified copolymers of vinylpyrrolidone and styrene, acidified copolymers of vinylpyrrolidone and acrylic acid, cationic polyelectrolyte polymers, acidified n-alkyl-2-pyrrolidones, or the like.

As indicated previously, the complex formed by ionic interaction between the anionic colorant and the cationic leaching inhibitor can be hydrophobic. Thus, the solubility of the complex can be low in hydrophilic or polar media such as urine, thereby significantly reducing or completely inhibiting leaching of the colorant from the substrate.

Along the same lines, a complex formed by ionic interaction between a pH-sensitive colorant which is cationic in its second color state and an anionic leaching inhibitor can also be hydrophobic and correspondingly, the solubility of such a complex can be low in hydrophilic or polar media such as urine, thereby significantly reducing or completely inhibiting leaching of the colorant from a substrate.

As to these particular embodiments, dyes and/or pH indicators which can be neutral in their basic state and cationic after contact with urine, thus facilitating scavenging by an anionic leaching inhibitor, can include heterocyclic acridine aromatics, such as acridine and acridine orange; diphenylmethane dyes, such as auramine O; triphenylmethane dyes, such as basic fuchsin; cationic thiazine dyes, such as azure C; cationic anthraquinone dyes, such as basic blue 47; phthalocyanine type dyes, such as copper phthalocyanine; or the like. Permanently charged cationic dyes and pH indicators that can be scavenged by an anionic leaching inhibitor may include quaternized phthalocyanine type dyes, such as alcec blue; cationic polymethine dyes, such as astrazon orange G; or the like. Neutral dyes and pH indicators can include anthraquinone type, such as alizarin; the neutral complex dyes, such as azure A eosinate; the terpene type, such as trans-beta-carotene; or the like.

As indicated above, the present composition can be a printable ink formulation that can include one more solvents (which may be volatile) in which the colorant, the leaching inhibitor, and the resin can be dispersed, dissolved, or solubilized, and which, as to particular embodiments, can evaporate upon printing. Importantly, the solvent of the present composition is liquid at room temperature; in stark contrast, the carrier matrix of U.S. Pat. No. 6,772,708, which as noted and detailed above, is solid at room temperature, and which "is a meltable composition and solidifies, i.e., achieves a solid or semi-solid physical state, rapidly via cooling. In certain embodiments, the inclusion of crystalline materials such as paraffin waxes can increase the solidification rate of the composition. The carrier matrix may be an adhesive or other meltable composition having a melting point above room temperature, such as a skin care composition or a component thereof." Column 7, Lines 38-46. Of course, such a meltable composition is required to provide the requisite HMWI of U.S. Pat. No. 6,772,708.

As to particular embodiments, it can be said that the solvent or carrier matrix of the present printable ink formulation consists essentially of or consists of one or more liquid components or components that are liquid at room temperature.

As to particular embodiments, it can be said that the present printable ink formulation consists essentially of or consists of one or more liquid components or components that are liquid at room temperature.

As to particular embodiments, it can be said that the present printable ink formulation consists essentially of or consists of liquid at room temperature.

For successful high-speed printing on a substrate which meets both printability and performance requirements, the present printable ink formulation may necessarily comprise a relatively low viscosity. As to particular embodiments, the present ink formulation can have a viscosity (measured in centipoise (cP)) in the range of between about 25 cP and about 125 cP. As to particular embodiments, the present ink formulation can have a viscosity in the range of between about 30 cP and about 100 cP. As to particular embodiments, the present ink formulation can have a viscosity of not greater than about 150 cP, not greater than about 125 cP, not greater than about 100 cP, not greater than about 75 cP, not greater than about 50 cP, or not greater than about 25 cP, depending upon the embodiment, as measured by a #2 Zahn cup at 25° C. Following, the present ink formulation can be formulated for printing on a substrate via a printer, as detailed above.

As to particular embodiments, it can be said that the present printable ink formulation does not include a solvent or carrier matrix which is solid or meltable at room temperature, or the present printable ink formulation is devoid of a solvent or carrier matrix which is solid or meltable at room temperature.

As to particular embodiments, solvents which may be useful with the present composition can include organic solvents.

As to particular embodiments, solvents which may be useful with the present composition can include alcohols, such as 1-propanol, methanol, ethanol, isopropanol, butanol, isobutanol, or the like.

As to particular embodiments, solvents which may be useful with the present composition can include acetates, such as propyl acetate, ethyl acetate, propylene glycol, diethylene glycol, triethylene glycol, tripropylene glycol, glycol ethers (such as 1-methoxy-2 propanol, 1-ethoxy-2-propanol, 1-propoxy-2-propanol, etc.), or the like. Worth mentioning, as to particular embodiments, a glycol ether may be useful with the present composition to adjust drying rates of the printable ink formulation; for example, to slow the drying rate.

As to particular embodiments, a mixture of solvents may be useful with the present composition, such as a mixture of at least one alcohol and at least one acetate.

As to particular embodiments, a mixture of solvents may be useful with the present composition, such as a mixture of at least two alcohols.

As to particular embodiments, solvents which may be useful with the present composition can include those which provide the above-detailed viscosities whereby, to reiterate, these relatively low viscosities may be necessary for successful high-speed printing of the present ink formulation on a substrate.

As indicated above, the present composition can be a printable ink formulation that can include one more resins, whereby the resin can be dispersed, dissolved, or solubilized in the solvent and can function as a binder to facilitate adhesion of the colorant to the substrate.

As to particular embodiments, resins which may be useful with the present composition can include polyvinyl butyrals (such as MOWITAL® BA 20 S, available from Kuraray), polyketone resins (such as Reactol™ 1717H, available from Lawter, Inc.), polyamide resins (such as Flex-Rez™ 1155AS, available from Lawter, Inc.), phenolic resins (such as Reactol™ 1111E, available from Lawter, Inc.), fumaric resin esters (such as Filtrez™ 526 A, available from Lawter, Inc.), polyurethane resins (such as NeoRez® U-335, available from DSM Coating Resins B.V.), nitrocellulose resins, or the like.

As to particular embodiments, the resin can have a glass transition temperature (Tg) of not greater than about 150° C., or not greater than about 100° C., whereby a resin having such a glass transition temperature may facilitate adhesion of the composition to a substrate while also imparting flexibility to the applied (dried) composition, thereby reducing or inhibiting cracking and/or chipping of the applied composition. Additionally, such a glass transition temperature may allow the resin to be incorporated into the present composition that is configured to be printed and therefore, is liquid at room temperature.

Of note, it has been found that in accordance with the present invention, as to particular embodiments, resins which are relatively less polar (or less hydrophilic or more nonpolar or more hydrophobic), for example a resin containing C=O relative to a resin containing —OH or —CHO, may have a slower color change reaction rate, possibly due to the general water resistance of the less polar resin.

As to particular embodiments, a preferred resin which, together with the other components, provides a printable ink formulation which meets the desired printability and performance requirements, may have a relatively high solubility in organic solvents. However, the combination of such a resin and organic solvent(s) can result in a decreased viscosity of the corresponding ink formulation which may render said ink formulation unsuitable for high-speed printing. As but one illustrative example, a polyketone resin, which may be relatively less polar, dispersed, dissolved, or solubilized in a solvent comprising one or more alcohols can result in an ink formulation having a viscosity which may be too low for successful high-speed printing.

Correspondingly, as to particular embodiments, the present composition can include a viscosity modifier. As to particular embodiments, the viscosity modifier can function to increase the viscosity of the ink formulation to provide a printable ink formulation which meets the desired printability and performance requirements when printed via high-speed printing. As to particular embodiments, viscosity modifiers which may be useful with the present composition to increase the viscosity thereof can include organoclays (for example, CLAYTONE-HY, available from BYK-Chemie GmbH), paraffin waxes, micronized polytetrafluoroethylene (PTFE), cellulosic rheology inhibitors (such as methyl cellulose, hydroxypropyl methyl cellulose, etc.), melamine/formaldeyde capsules, urea/formaldehyde capsules, silica ($SiO_2$) (such as fumed silica, hydrophilic fumed silica, chemically modified silica (functionalized by the addition of silicon-organic groups to the polymer backbone), or the like), or the like. As to particular embodiments, a preferred viscosity modifier may be chemically inert relative to (i) the colorant-leaching inhibitor chemistry and (ii) the solvent(s).

Regarding the latter, as to particular embodiments, a viscosity modifier which may be useful with the present composition to increase the viscosity thereof can be fumed silica (also known as pyrogenic silica) which comprises amorphous silicon dioxide particles synthesized by hydrolysis in an oxyhydrogen flame. As to particular embodiments, a viscosity modifier which may be useful with the present composition to increase the viscosity thereof can be hydrophilic fumed silica, which can be wetted with and dispersed in water as opposed to hydrophobic fumed silica. In addition to increasing viscosity, it has been found that the inclusion of silica in the printable ink formulation can impart a matte finish to the printed ink and/or reduce the stickiness/tackiness of the printed ink.

Furthermore, it has been found that silica may also affect the rate of the color change reaction. Of note, it has been found that in accordance with the present invention, as to particular embodiments, the ratio of resin:silica can affect the rate of the color change reaction. As an illustrative example including a polyketone resin and hydrophilic fumed silica, a higher resin:silica ratio (such as ≥4:1) may provide a slower color change reaction rate, whereas a lower resin:silica ratio (such as ≤4:1) may provide a faster color change reaction rate.

As to particular embodiments including a substrate comprising low-density polyethylene, when a relatively fast color change reaction rate (for example, wherein the color changes in ≤2 minutes) is desired, a resin (for example, a polyketone resin):silica (for example, hydrophilic fumed silica) ratio of about 2.6:1 may be useful with the present composition.

As to particular embodiments including a nonwoven substrate, when a relatively fast color change reaction rate (for example, wherein the color changes in ≤2 minutes) is desired, a resin (for example, a polyketone resin):silica (for example, hydrophilic fumed silica) ratio of about 1.8:1 may be useful with the present composition.

More generally, when a color change reaction time of not greater than about 2 minutes is desired, a resin:silica ratio of between about 1:1 and about 2:1 may be useful with the present composition. When a color change reaction time of between about 2 and about 4 minutes is desired, a resin:silica ratio of between about 2.5:1 and about 3.5:1 may be useful with the present composition. When a color change reaction time of not less than about 15 minutes is desired, a resin:silica ratio of not less than about 4:1 may be useful with the present composition.

As to particular embodiments, a resin (for example, a polyketone resin):silica (for example, hydrophilic fumed silica) ratio of about 1:1 may be useful with the present composition when a relatively fast color change reaction rate (for example, wherein the color changes in ≤2 minutes) is desired.

Of note, it has been found that in accordance with the present invention, as to particular embodiments, the inclusion of silica in the present composition can affect the printed surface, such as by increasing the texture/surface area of the substrate (due to the higher solids content) which, as detailed above, may facilitate an increased (i) rate of the color change reaction and/or (ii) color density. Further, the inclusion of silica in the present composition can increase the hydrophilicity thereof, which may also facilitate an increased rate of the color change reaction.

As to particular embodiments, the present composition can include one or more acids (or acidic materials) which may function, at least in part, to stabilize the system and reduce or completely inhibit premature color changes of the colorant caused by exposure to ambient moisture or humidity. The inclusion of the acid can aid in maintaining a low pH environment around the colorant even when the system is exposed to said ambient moisture or humidity. This maintenance of a low pH environment can keep the colorant in its neutral and lightly colored state. As illustrative examples, acids which may be useful with the present composition can include organic acids, such as monostearyl phosphate; citrate esters, such as monostearyl citrate; glycolate esters; lactate esters; fatty acids, such as stearic and palmitic acid; ether carboxylic acids; N-acyl sarcosinic acid surfactants; N-acyl glutamic acid surfactants; N-acyl ethylenediaminetriacidic acid surfactants; alkane sulfonic acids; alpha-olefin sulfonic acids; alpha-sulfonic acid fatty acid methyl esters; sulfate esters; fruit acids, such as citric acid; salicylic acid; inorganic acids, such as phosphoric acid; or the like.

As to particular embodiments, in addition to the above benefits, the acid(s) used with the present composition may function to buffer a component(s) of the substrate. For example, substrates (such as those comprising polyethylene) can include calcium carbonate ($CaCO_3$) as a filler, whereby this basic component may increase the substrate surface pH which can negatively affect the stability of the colorant and/or trigger premature activation of the colorant in the presence of ambient moisture or humidity; the inclusion of acid(s) in the present composition can address the foregoing.

As to particular embodiments, the present composition can include one or more humectants which may be relatively slow drying; as such, the humectant(s) may function to prevent a buildup of ink residue(s) in the print heads of the printer. As illustrative examples, humectants which may be useful with the present composition can include glycerin, propylene glycol, dipropylene glycol, glycol ethers, or the like.

Preferably, the concentrations and compositions of each of the components of the present composition can be concurrently tuned and optimized for several important properties: 1) minimal pH-sensitive colorant leaching, 2) high contrast color change, 3) desired color change kinetics, 4) stability in the presence of ambient moisture or humidity during storage and use, 5) adhesion to the substrate, 6) ease of processing, and 7) low cost.

Now regarding application, the present composition can be an ink formulation that is liquid at room temperature and/or may comprise the viscosities and/or glass transition temperatures discussed herein; correspondingly, the present composition may be printed on a substrate, such as an absorbent article (10) or a component thereof, via a printing process (as opposed to, for example, a slot-die coating process) in any desired configuration, design, pattern, indicium, etc. including, but not limited to, stripes, dots, shapes, geometric shapes, alphanumeric characters, pictorial representations of animate or inanimate objects, or the like, or any combination or arrangement thereof.

Now referring primarily to FIGS. 1, 13, 14, and 15, the present composition can be printed on a substrate, such as an absorbent article (10) or a component thereof, as one or more discrete graphics, wherein a graphic may be relatively small and/or intricate and/or disposed in a distinct pattern(s).

As to particular embodiments, when incorporated into an absorbent article (10), the graphic(s) (78) can be visible from a garment-facing surface (2) of the absorbent article (10). Following, the present composition can provide a signal visible from outside the absorbent article (10) when the absorbent article (10) is being worn, whereby the signal can be the color change of the colorant from the first color state to the second color state. As to particular embodiments, the signal can preferably be visible within a short time after urination. Generally, the signal can be visible within about fifteen minutes after urine contacts the composition. As to particular embodiments, the signal can be visible within about five minutes after contact with urine. As to particular embodiments, the signal can be visible within about two minutes after contact with urine.

As an illustrative example, the graphic(s) can be disposed on an absorbent core-facing surface (1400) of the backsheet (28), thus allowing the composition to be contacted by bodily exudates within an absorbent core (30) of the absorbent article (10).

As opposed to a HMWI strip, the present composition can be printed on a substrate as a graphic having an area of between about 0.02 $cm^2$ and about 25 $cm^2$, between about 0.035 $cm^2$ and about 15 $cm^2$, between about 0.05 $cm^2$ and about 10 $cm^2$, between about 0.05 $cm^2$ and about 5 $cm^2$, between about 0.065 $cm^2$ and about 2.5 $cm^2$, or between about 0.065 $cm^2$ and about 1.0 $cm^2$, specifically reciting all values within these ranges and any ranges formed therein or thereby. As to particular embodiments including a plurality of discrete graphics, individual graphics may be spaced apart from one another by at least about 2 mm, at least about 5 mm, at least about 8 mm, at least about 12 mm, or at least about 15 mm, specifically reciting all values within these ranges and any ranges formed therein or thereby. Such a plurality of discrete graphics and dispersed disposition of the present composition may not only be more aesthetically pleasing as compared to a single strip of a wetness indicating composition as is typical of hot melt wetness indicators, but also may improve the functioning of the absorbent article (10). By disposing a plurality of discrete graphics over a portion of the absorbent article (10), the article (10) may be able to detect wetness over a greater area of the article (10) and notify a user or caretaker earlier of a wetness incident. And, in part, because of the relatively low viscosity and thin application of the present composition, a greater area of the absorbent article (10) may be covered by the same amount, or less, of the composition. The extensive application area of the present composition may improve the wetness-indicating function of the absorbent article (10), as wetness may be detected over a much broader area of the article (10) rather than in just a central area. In contrast, when an absorbent article (10) has a wetness indicating composition disposed in a single strip—such as when the wetness indicating composition is in the form of a hot melt wetness indicator—wetness will only be indicated when the wetness reaches the single strip of wetness indicating composition. As to particular embodiments, the present composition may be disposed on an absorbent article (10) in a plurality of at least about 5, at least about 8, at least about 10, at least about 15, at least about 25, or at least about 50 individual, discrete graphics.

Further, in contrast to HMWIs, the present composition can be incorporated into a substrate at a relatively low level (or amount). For example, as to particular embodiments, an absorbent article (10) or a component thereof can comprise not greater than about 50 mg, not greater than about 45 mg, not greater than about 35 mg, not greater than about 25 mg, not greater than about 15 mg, not greater than about 10 mg, between about 3 mg and about 50 mg, between about 1 mg and about 45 mg, between about 1 mg and about 35 mg, between about 1 mg and about 25 mg, between about 1 mg and about 15 mg, or between about 1 mg and about 10 mg of the composition, specifically reciting all values within these ranges and any ranges formed therein or thereby.

While the application level (or amount) of the present composition can be relatively low, the application area can be relatively large. For example, as to particular embodiments, the present composition can be disposed on between about 0.5% and about 65%, between about 1% and about 50%, between about 2% and about 45%, between about 5% and about 40%, or between about 8% and about 38% of an absorbent article (10) or a component thereof, specifically reciting all values within these ranges and any ranges formed therein or thereby.

Additionally, the present composition can have a relatively lesser thickness (as measured from the surface of the substrate, such as an absorbent article (10) or a component thereof, in the z-direction), such as a thickness of between about 0.5 microns and about 12 microns, between about 1 micron and about 10 microns, or between about 4 microns and about 8 microns, specifically reciting all values within these ranges and any ranges formed therein or thereby, which may be markedly different from the substantially greater thickness of a HMWI on an absorbent article (10).

As to particular embodiments, the present graphic(s) (78) can comprise, consist essentially of, or consist of the composition. As to other particular embodiments, the graphic(s) (78) can comprise the present composition and other and/or additional inks, pigments, colorants, or the like. For example, as to particular embodiments, the present composition can be coupled to a substrate, such as an absorbent article (10) or a component thereof, in conjunction with permanent graphics.

The below compositions are non-limiting examples of printable ink formulations of the present invention:

| PRINTABLE INK FORMULATION 1 | | |
| --- | --- | --- |
| Function | Chemical | Weight Percent |
| pH-sensitive colorant | bromophenol blue | 0.5-2% |
| leaching inhibitor | tetraoctyl ammonium bromide | 0.5-4% |
| solvent | ethanol | 2-40% |
| solvent | 1-propanol | 40-65% |
| solvent | propyl acetate | 5-15% |
| solvent | ethyl acetate | 5-10% |
| resin | polyvinyl butyral | 10-20% |
| acid | citric acid | 0.2-5% |

| PRINTABLE INK FORMULATION 2 | | |
| --- | --- | --- |
| Function | Chemical | Weight Percent |
| pH-sensitive colorant | bromophenol blue | 1-2% |
| leaching inhibitor | tetraoctyl ammonium bromide | 1-4% |
| solvent | 1-propanol | 50-65% |
| solvent | propyl acetate | 5-10% |
| solvent | ethyl acetate | 5-10% |
| resin | polyvinyl butyral | 10-20% |
| acid | citric acid | 0.2-4% |

| PRINTABLE INK FORMULATION 3 | | |
| --- | --- | --- |
| Function | Chemical | Weight Percent |
| pH-sensitive colorant | bromophenol blue | 1% |
| leaching inhibitor | tetraoctyl ammonium bromide | 2% |
| solvent | 1-propanol | 65% |
| solvent | propyl acetate | 8.4% |
| solvent | ethyl acetate | 7.6% |
| resin | polyvinyl butyral | 15% |
| acid | citric acid | 1% |

| PRINTABLE INK FORMULATION 4 | | |
| --- | --- | --- |
| Function | Chemical | Weight Percent |
| pH-sensitive colorant | bromophenol blue | 2% |
| leaching inhibitor | tetraoctyl ammonium bromide | 4% |
| solvent | 1-propanol | 64% |
| solvent | propyl acetate | 8% |
| solvent | ethyl acetate | 7% |
| resin | polyvinyl butyral | 15% |

| PRINTABLE INK FORMULATION 5 | | |
| --- | --- | --- |
| Function | Chemical | Weight Percent |
| pH-sensitive colorant | bromophenol blue | 0.3-3% |
| leaching inhibitor | didodecyldimethyl ammonium chloride | 0.3-3% |
| solvent | ethanol | 40-50% |
| solvent | ethyl acetate | 10-20% |
| solvent | propyl acetate | 20-30% |
| resin | polyvinyl butyral | 10-20% |
| acid | hexaethyl tetraphosphate | 2-8% |

PRINTABLE INK FORMULATION 6

| Function | Chemical | Weight Percent |
|---|---|---|
| pH-sensitive colorant | bromophenol blue | 0.3-3% |
| leaching inhibitor | didodecyldimethyl ammonium chloride | 0.3-3% |
| solvent | ethanol | 40-50% |
| solvent | ethyl acetate | 10-15% |
| solvent | propyl acetate | 15-25% |
| solvent | propoxy propanol | 2-10% |
| resin | polyvinyl butyral | 12-18% |
| acid | hexaethyl tetraphosphate | 2-8% |

PRINTABLE INK FORMULATION 7

| Function | Chemical | Weight Percent |
|---|---|---|
| pH-sensitive colorant | bromophenol blue | 0.3-3% |
| leaching inhibitor | tetraoctyl ammonium bromide | 0.3-3% |
| solvent | propanol | 50-70% |
| solvent | propoxy propanol | 5-15% |
| resin | polyvinyl butyral | 2-10% |
| resin | polyketone | 20-30% |
| acid | hexaethyl tetraphosphate | 2-8% |

PRINTABLE INK FORMULATION 8

| Function | Chemical | Weight Percent |
|---|---|---|
| pH-sensitive colorant | bromophenol blue | 0.3-3% |
| leaching inhibitor | tetraoctyl ammonium bromide | 0.3-3% |
| solvent | isopropanol | 40-60% |
| solvent | propyl acetate | 10-20% |
| resin | polyvinyl butyral | 8-12% |
| acid | citric acid | 2-8% |
| microcapsules | 0.5-6 micron microcapsules | 10-20% |

PRINTABLE INK FORMULATION 9

| Function | Chemical | Weight Percent |
|---|---|---|
| pH-sensitive colorant | bromophenol blue | 0.3-3% |
| leaching inhibitor | tetraoctyl ammonium bromide | 0.3-3% |
| solvent | propanol | 50-70% |
| solvent | ethoxy propanol | 0-10% |
| resin | polyketone | 10-30% |
| acid | citric acid | 2-8% |
| viscosity modifier | fumed silica | 3-15% |

PRINTABLE INK FORMULATION 10

| Function | Chemical | Weight Percent |
|---|---|---|
| pH-sensitive colorant | bromophenol blue | 0.3-3% |
| leaching inhibitor | tetraoctyl ammonium bromide | 0.3-3% |
| solvent | ethanol | 35-55% |
| solvent | propanol | 20-30% |
| resin | polyketone | 10-30% |
| acid | citric acid | 2-8% |
| viscosity modifier | chemically modified silica | 0-10% |
| humectant | glycerin | 0.5-2% |

PRINTABLE INK FORMULATION 11

| Function | Chemical | Weight Percent |
|---|---|---|
| pH-sensitive colorant | bromophenol blue | 0.8-2% |
| leaching inhibitor | tetraoctyl ammonium bromide | 1.2-4% |
| solvent | ethanol | 38-43% |
| solvent | propanol | 22.8-25.8% |
| solvent | propyl acetate | 15.2-17.2% |
| resin | polyvinyl butyral | 10-15% |
| acid | citric acid | 2-3% |

PRINTABLE INK FORMULATION 12

| Function | Chemical | Weight Percent |
|---|---|---|
| pH-sensitive colorant | bromophenol blue | 0.5-1% |
| leaching inhibitor | tetraoctyl ammonium bromide | 0.5-1.5% |
| solvent | ethanol | 60.4-68.8% |
| solvent | ethoxy propanol | 15.1-17.2% |
| resin | polyvinyl butyral | 10-15% |
| acid | citric acid | 3-7% |

PRINTABLE INK FORMULATION 13

| Function | Chemical | Weight Percent |
|---|---|---|
| pH-sensitive colorant | bromophenol blue | 0.5-1% |
| leaching inhibitor | tetraoctyl ammonium bromide | 0.5-1% |
| solvent | ethanol | 11.2-14.2% |
| solvent | propanol | 33.6-42.6% |
| solvent | propoxy propanol | 11.2-14.2% |
| resin | polyketone | 25-35% |
| acid | citric acid | 3-7% |

PRINTABLE INK FORMULATION 14

| Function | Chemical | Weight Percent |
|---|---|---|
| pH-sensitive colorant | bromophenol blue | 0.5-1% |
| leaching inhibitor | tetraoctyl ammonium bromide | 0.5-1.5% |
| solvent | n-propanol | 57.5-74% |
| resin | polyvinyl butyral | 2-3% |
| resin | polyketone | 20-30% |
| acid | citric acid | 3-7% |

PRINTABLE INK FORMULATION 15

| Function | Chemical | Weight Percent |
|---|---|---|
| pH-sensitive colorant | bromophenol blue | 0.5-1% |
| leaching inhibitor | tetraoctyl ammonium bromide | 0.5-1.5% |
| solvent | n-propanol | 52.5-79% |
| resin | polyketone | 12-26% |
| acid | citric acid | 3-7% |
| viscosity modifier | fumed silica | 5-12% |

PRINTABLE INK FORMULATION 16

| Function | Chemical | Weight Percent |
|---|---|---|
| pH-sensitive colorant | bromophenol blue | 0.8% |
| leaching inhibitor | tetraoctyl ammonium bromide | 0.8% |
| solvent | n-propanol | 62.4% |

-continued

PRINTABLE INK FORMULATION 16

| Function | Chemical | Weight Percent |
|---|---|---|
| resin | polyketone | 22% |
| acid | | 5% |
| viscosity modifier | fumed silica | 9% |

PRINTABLE INK FORMULATION 17

| Function | Weight Percent |
|---|---|
| pH-sensitive colorant | 0.3-3% |
| leaching inhibitor | 0.3-3% |
| solvent | 41-84.4% |
| resin | 10-30% |
| acid | 2-8% |
| viscosity modifier | 3-15% |

The preceding printable ink formulations can be made by first combining the solvents in a mixing vessel. The resin can then be added to and/or dissolved in the solvent mixture via continuous mixing over time at room temperature, whereby the time can be dependent upon volume and shear of the mixer. Next, the pH-sensitive colorant, leaching inhibitor, and acid (if used) can be added to and/or dissolved in the solvent-resin mixture via continuous mixing over time at room temperature, whereby the time can be dependent upon volume and shear of the mixer. Subsequently, the viscosity modifier can be added to the formulation, whereby the amount can be dependent upon the targeted viscosity of the printable ink formulation. Of note, the present printable ink formulations need not be heated during preparation, which can be in stark contrast to Formulas 1, 2, and 3 of U.S. Pat. No. 6,772,708, which require heating, at least to melt the carrier matrices which are solid at room temperature.

As to particular embodiments, the present printable ink formulations can be adjustable for drying rate and press runnability, for example by adding a solvent(s) which can slow down the evaporation rate or by adding a solvent(s) which can speed up the evaporation rate (for example to make the ink dry more quickly on a higher speed production line).

As indicated above, the present composition can be used in conjunction with a wearable article, including but not limited to an absorbent article (10).

General Description of an Absorbent Article

Figure 2:
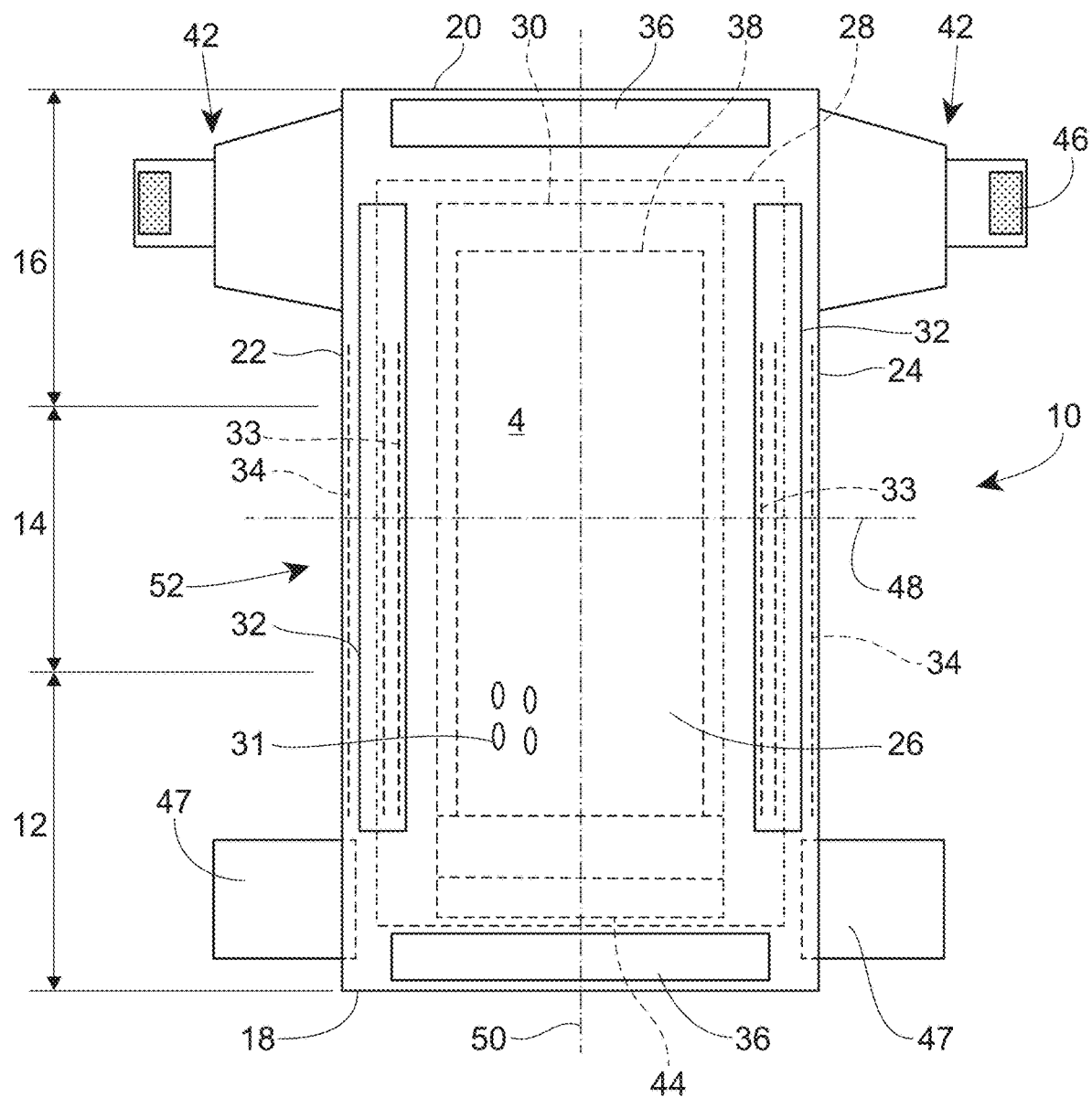
FIG. 2 is a plan view of the example absorbent article of FIG. 1, wearer-facing surface facing the viewer, in a flat laid-out state.
Figure 3:
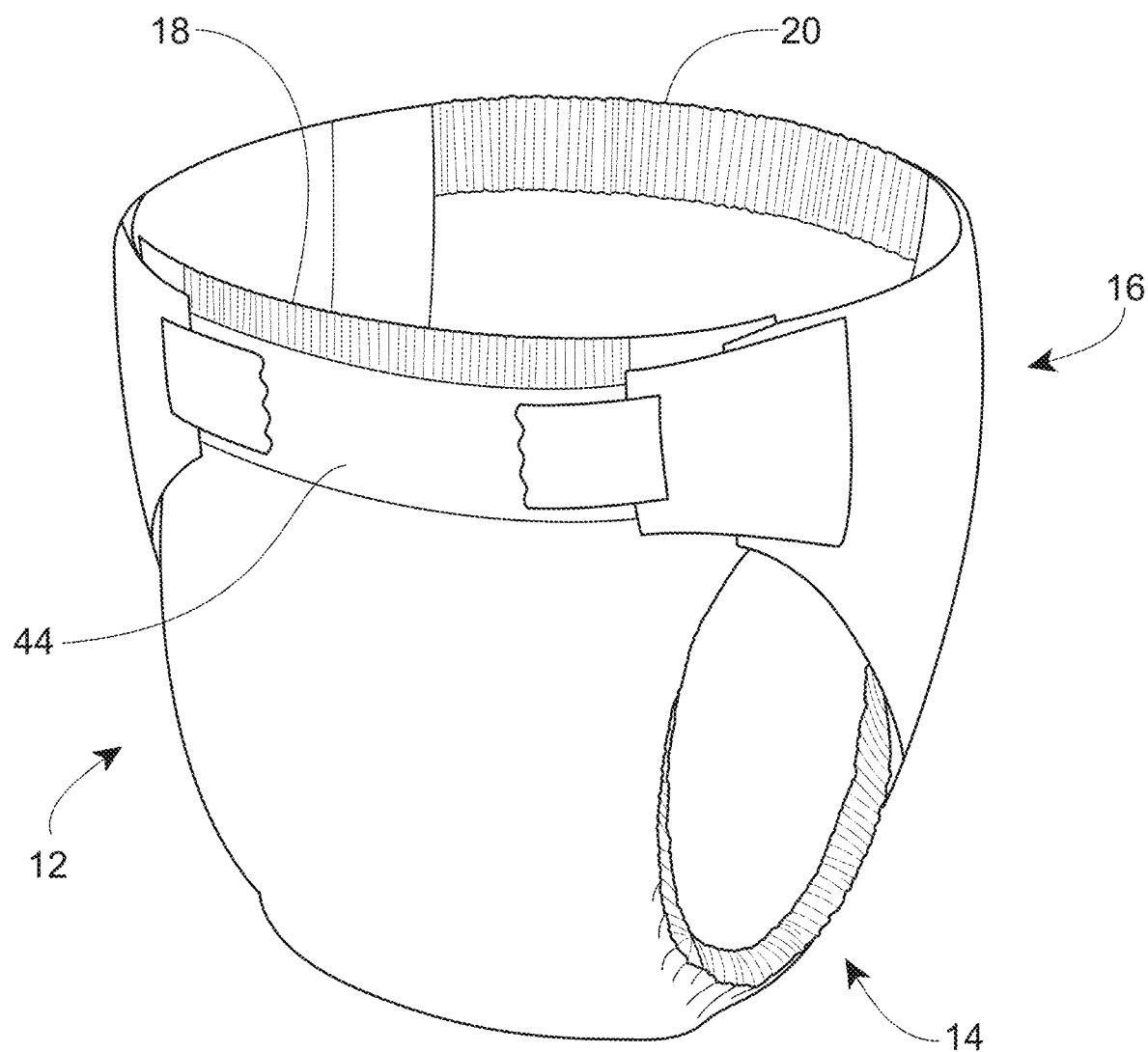
FIG. 3 is a front perspective view of the absorbent article of FIGS. 1 and 2 in a fastened configuration.

An example absorbent article (10) according to the present disclosure, shown in the form of a taped diaper, is represented in FIGS. 1 through 3. FIG. 1 is a plan view of the example absorbent article (10), garment-facing surface (2) facing the viewer, in a flat laid-out state (i.e., no elastic contraction). FIG. 2 is a plan view of the absorbent article (10) of FIG. 1, wearer-facing surface (4) facing the viewer, in a flat laid-out state. FIG. 3 is a front perspective view of the absorbent article (10) of FIGS. 1 and 2 in a fastened configuration. The absorbent article (10) of FIGS. 1 through 3 is shown for illustration purposes only as the present disclosure may be used for making a wide variety of diapers, including adult incontinence products, pants, or other absorbent articles (10), such as sanitary napkins and absorbent pads, for example.

The absorbent article (10) may comprise a front waist region (12), a crotch region (14), and a back waist region (16). The crotch region (14) may extend intermediate the front waist region (12) and the back waist region (16). The front wait region (12), the crotch region (14), and the back waist region (16) may each be about ⅓ of the length of the absorbent article (10). The absorbent article (10) may comprise a front end edge (18), a back end edge (20) opposite to the front end edge (18), and longitudinally extending, transversely opposed side edges (22) and (24) defined by the chassis (52).

The absorbent article (10) may comprise a liquid permeable topsheet (26), a liquid impermeable backsheet (28), and an absorbent core (30) positioned at least partially intermediate the topsheet (26) and the backsheet (28). The absorbent article (10) may also comprise one or more pairs of barrier leg cuffs (32) with or without elastic (33), one or more pairs of leg elastics (34), one or more elastic waistbands (36), and/or one or more acquisition materials (38). The acquisition material or materials (38) may be positioned intermediate the topsheet (26) and the absorbent core (30). An outer cover material (40), such as a nonwoven material, may cover a garment-facing surface (2) of the backsheet (28). The absorbent article (10) may comprise back ears (42) in the back waist region (16). The back ears (42) may comprise fasteners (46) and may extend from the back waist region (16) of the absorbent article (10) and attach (using the fasteners (46)) to the landing zone area or landing zone material (44) on a garment-facing surface (2) of the front waist region (12) of the absorbent article (10). The absorbent article (10) may also have front ears (47) in the front waist region (12). The absorbent article (10) may have a central lateral (or transverse) axis (48) and a central longitudinal axis (50). The central lateral axis (48) extends perpendicular to the central longitudinal axis (50).

Figure 4:
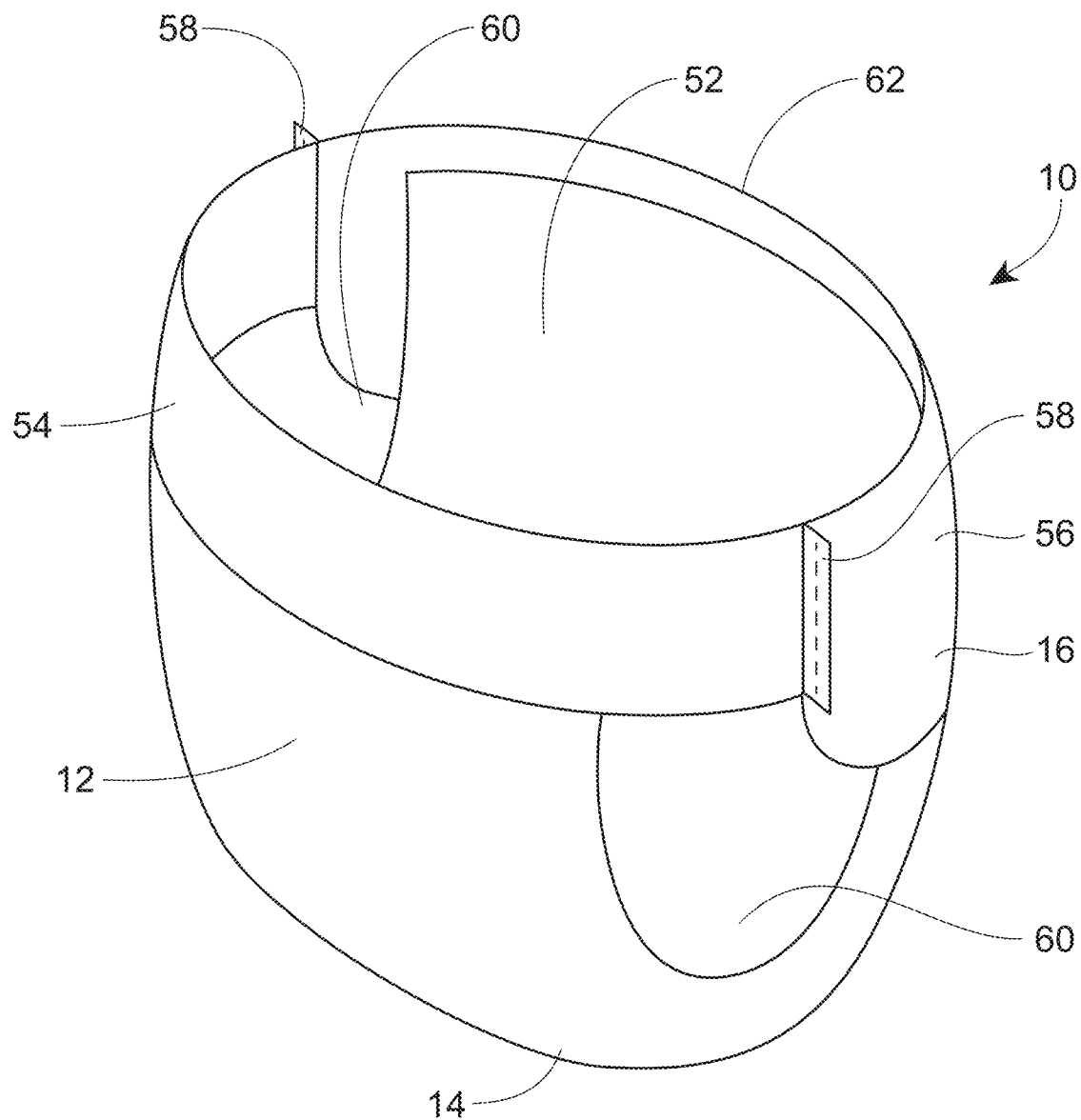
FIG. 4 is a front perspective view of an example absorbent article in the form of a pant.
Figure 5:
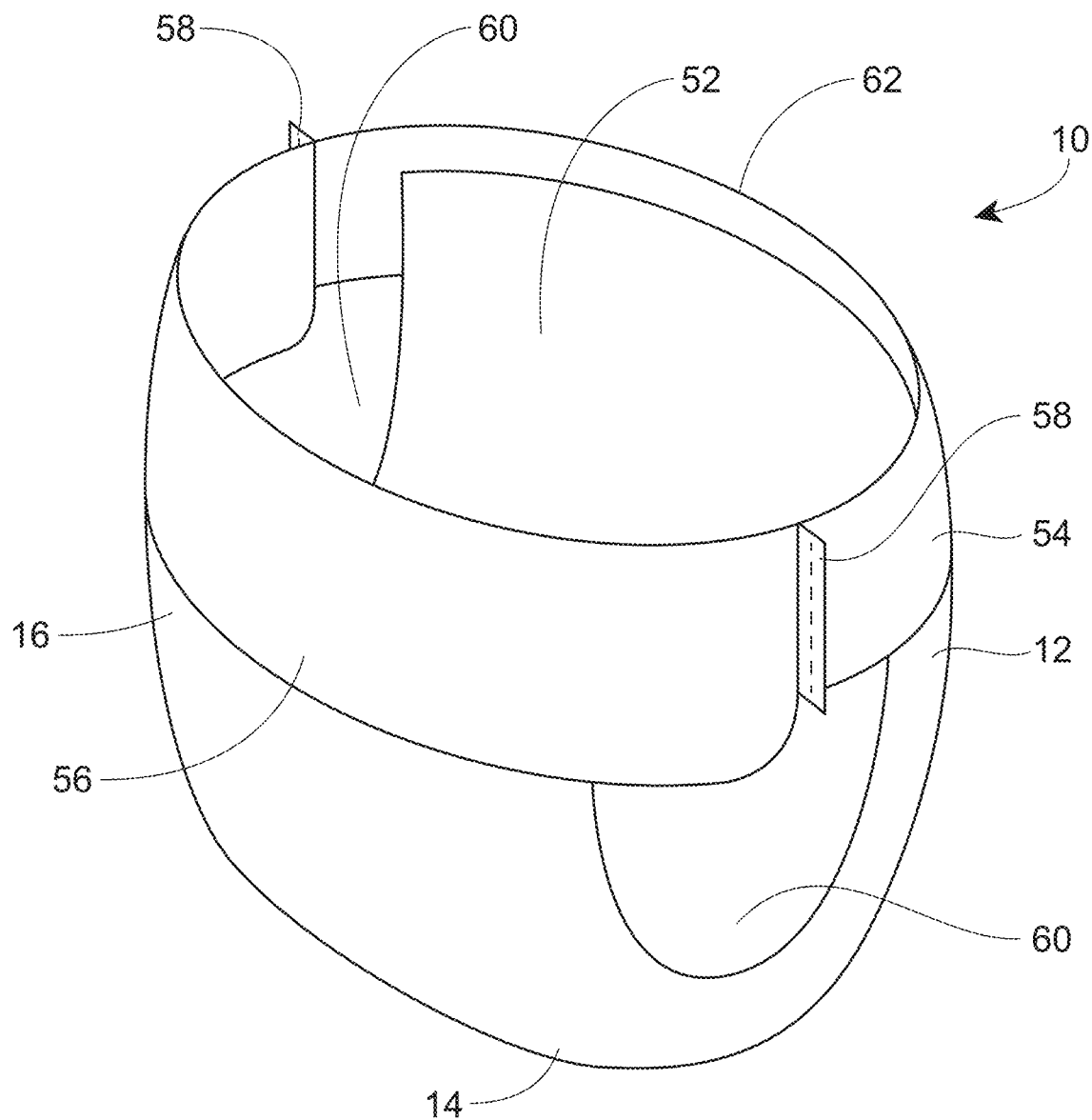
FIG. 5 is a rear perspective view of the absorbent article of FIG. 4.
Figure 6:
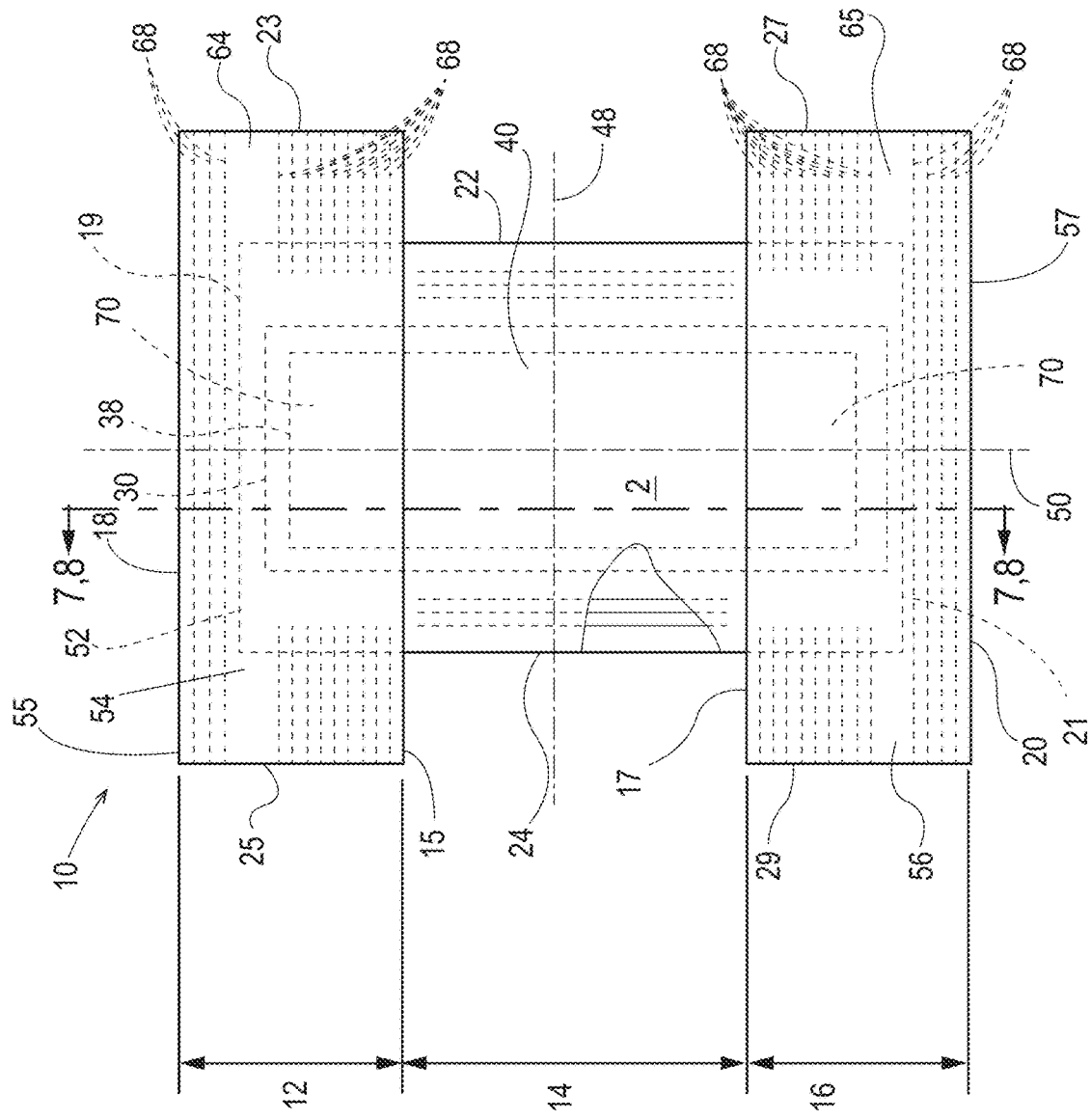
FIG. 6 is a plan view of the absorbent article of FIG. 4, laid flat, with a garment-facing surface facing the viewer.
Figure 7:
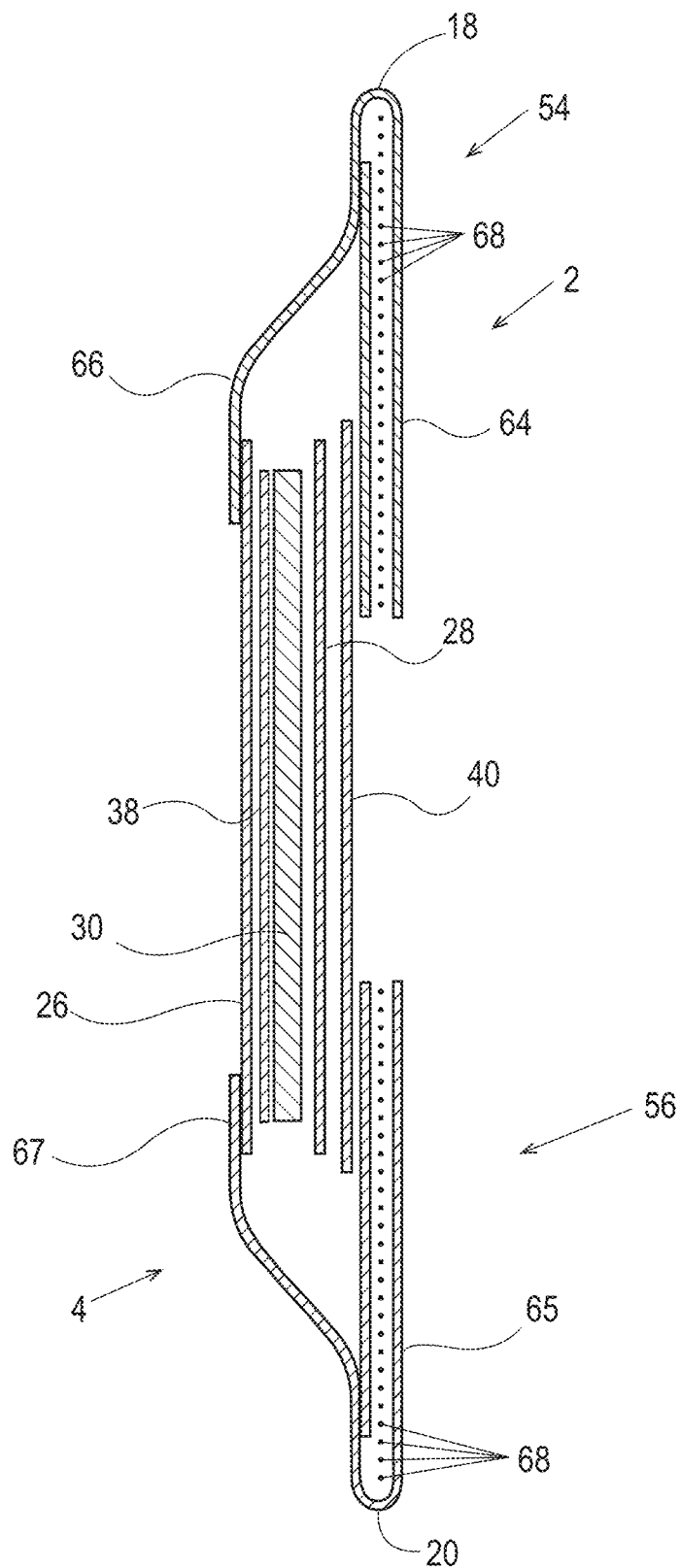
FIG. 7 is a cross-sectional view of the absorbent article taken about line 7-7 of FIG. 6.
Figure 8:
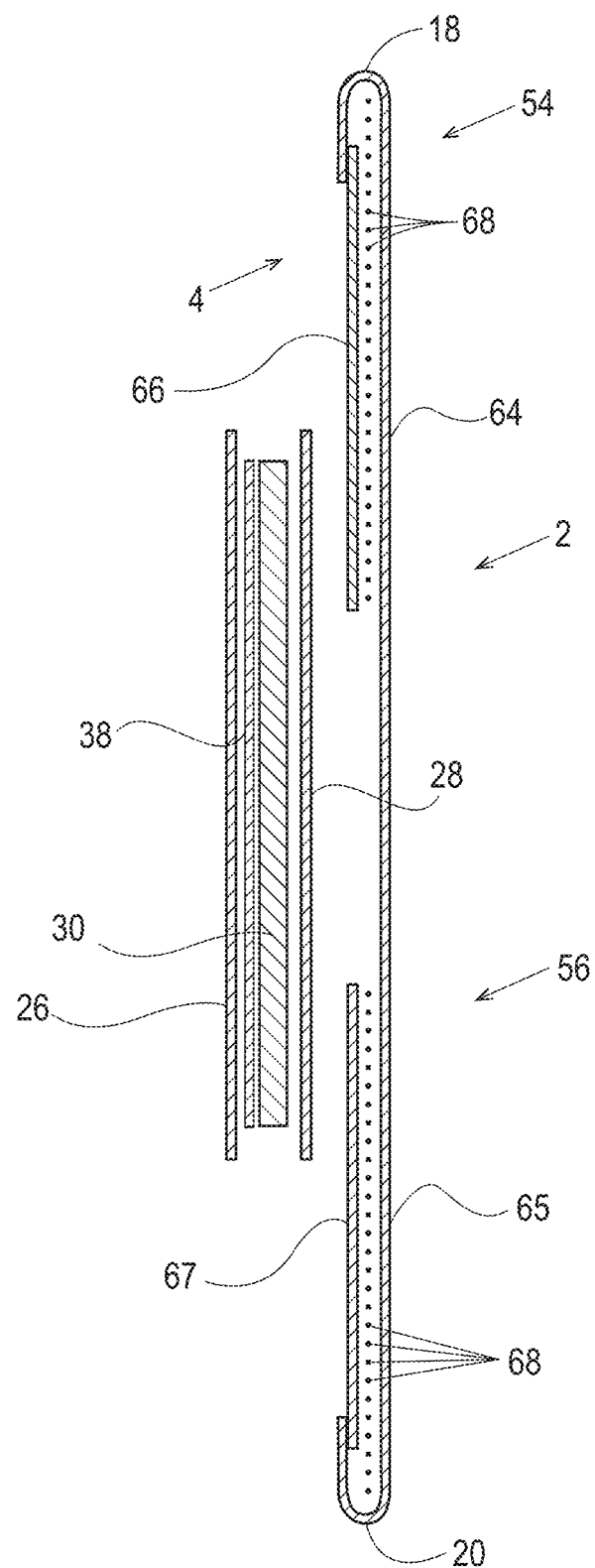
FIG. 8 is a cross-sectional view of the absorbent article taken about line 8-8 of FIG. 6.

In other instances, the absorbent article (10) may be in the form of a pant having permanent or refastenable side seams. Suitable refastenable seams are disclosed in U.S. Pat. Appl. Pub. No. 2014/0005020 and U.S. Pat. No. 9,421,137. Referring to FIGS. 4 through 8, an example absorbent article (10) in the form of a pant is illustrated. FIG. 4 is a front perspective view of the absorbent article (10). FIG. 5 is a rear perspective view of the absorbent article (10). FIG. 6 is a plan view of the absorbent article (10), laid flat, with the garment-facing surface (2) facing the viewer. Elements of FIGS. 4 through 8 having the same reference number as described above with respect to FIGS. 1 through 3 may be the same element (e.g., absorbent core (30)). FIG. 7 is an example cross-sectional view of the absorbent article (10) taken about line 7-7 of FIG. 6. FIG. 8 is an example cross-sectional view of the absorbent article (10) taken about line 8-8 of FIG. 6. FIGS. 7 and 8 illustrate example forms of front and back belts (54 and 56). The absorbent article (10) may have a front waist region (12), a crotch region (14), and a back waist region (16). Each of the regions (12, 14, and 16) may be 1/3 of the length of the absorbent article (10). The absorbent article (10) may have a chassis (52) (sometimes referred to as a central chassis or central panel) comprising a topsheet (26), a backsheet (28), and an absorbent core (30) disposed at least partially intermediate the topsheet (26) and the backsheet (28), and an optional acquisition material (38), similar to that as described above with respect to FIGS. 1 through 3. The absorbent article (10) may comprise a front belt (54) in the front waist region (12) and a back belt (56) in the back waist region (16). The chassis (52) may be joined to a wearer-facing surface (4) of the front and back belts (54 and 56) or to a garment-facing surface (2)

of the belts (54 and 56). Side edges (23 and 25) of the front belt (54) may be joined to side edges (27 and 29, respectively) of the back belt (56) to form two side seams (58). The side seams (58) may be any suitable seams known to those of skill in the art, such as butt seams or overlap seams, for example. When the side seams (58) are permanently formed or refastenably closed, the absorbent article (10) in the form of a pant has two leg openings (60) and a waist opening circumference (62). The side seams (58) may be permanently joined using adhesives or bonds, for example, or may be refastenably closed using hook and loop fasteners, for example.

Belts

Referring to FIGS. 7 and 8, the front and back belts (54 and 56) may comprise front and back inner belt layers (66 and 67) and front and back outer belt layers (64 and 65) having an elastomeric material (68) (e.g., strands or a film (which may be apertured)) disposed at least partially therebetween. The elastic elements (68) may be relaxed (including being cut) to reduce elastic strain over the absorbent core (30) or, may alternatively, run continuously across the absorbent core (30). The elastics elements (68) may have uniform or variable spacing therebetween in any portion of the belts (54 and 56). The elastic elements (68) may also be pre-strained the same amount or different amounts. The front and/or back belts (54 and 56) may have one or more elastic element-free zones (70) where the chassis (52) overlaps the belts (54 and 56). In other instances, at least some of the elastic elements (68) may extend continuously across the chassis (52).

The front and back inner belt layers (66 and 67) and the front and back outer belt layers (64 and 65) may be joined using adhesives, heat bonds, pressure bonds, or thermoplastic bonds. Various suitable belt layer configurations can be found in U.S. Pat. Appl. Pub. No. 2013/0211363.

Front and back belt end edges (55 and 57) may extend longitudinally beyond the front and back chassis end edges (19 and 21) (as shown in FIG. 6) or they may be co-terminus. The front and back belt side edges (23, 25, 27, and 29) may extend laterally beyond the chassis side edges (22 and 24). The front and back belts (54 and 56) may be continuous (i.e., having at least one layer that is continuous) from belt side edge to belt side edge (e.g., the transverse distances from 23 to 25 and from 27 to 29). Alternatively, the front and back belts (54 and 56) may be discontinuous from belt side edge to belt side edge (e.g., the transverse distances from 23 to 25 and from 27 to 29), such that they are discrete.

As disclosed in U.S. Pat. No. 7,901,393, the longitudinal length (along the central longitudinal axis (50)) of the back belt (56) may be greater than the longitudinal length of the front belt (54), and this may be particularly useful for increased buttocks coverage when the back belt (56) has a greater longitudinal length versus the front belt (54) adjacent to or immediately adjacent to the side seams (58).

The front outer belt layer (64) and the back outer belt layer (65) may be separated from each other, such that the layers are discrete or, alternatively, these layers may be continuous, such that a layer runs continuously from the front belt end edge (55) to the back belt end edge (57). This may also be true for the front and back inner belt layers (66 and 67)—that is, they may also be longitudinally discrete or continuous. Further, the front and back outer belt layers (64 and 65) may be longitudinally continuous while the front and back inner belt layers (66 and 67) are longitudinally discrete, such that a gap is formed between them—a gap between the front and back inner and outer belt layers (64, 65, 66, and 67) is shown in FIG. 7 and a gap between the front and back inner belt layers (66 and 67) is shown in FIG. 8.

The front and back belts (54 and 56) may include slits, holes, and/or perforations providing increased breathability, softness, and a garment-like texture. Underwear-like appearance can be enhanced by substantially aligning the waist and leg edges at the side seams (58) (see FIGS. 4 and 5).

The front and back belts (54 and 56) may comprise graphics (see e.g., 78 of FIG. 1). The graphics (78) may extend substantially around the entire circumference of the absorbent article (10) and may be disposed across side seams (58) and/or across proximal front and back belt seams (15 and 17); or, alternatively, adjacent to the seams (58, 15, and 17) in the manner described in U.S. Pat. No. 9,498,389 to create a more underwear-like article. The graphics (78) may also be discontinuous.

Alternatively, instead of attaching belts (54 and 56) to the chassis (52) to form a pant, discrete side panels may be attached to side edges of the chassis (22 and 24). Suitable forms of pants comprising discrete side panels are disclosed in U.S. Pat. Nos. 6,645,190; 8,747,379; 8,372,052; 8,361,048; 6,761,711; 6,817,994; 8,007,485; 7,862,550; 6,969,377; 7,497,851; 6,849,067; 6,893,426; 6,953,452; 6,840,928; 8,579,876; 7,682,349; 7,156,833; and 7,201,744.

Topsheet

The topsheet (26) is the part of the absorbent article (10) that is in contact with the wearer's skin. The topsheet (26) may be joined to portions of the backsheet (28), the absorbent core (30), the barrier leg cuffs (32), and/or any other layers as is known to those of ordinary skill in the art. The topsheet (26) may be compliant, soft-feeling, and non-irritating to the wearer's skin. Further, at least a portion of, or all of, the topsheet (26) may be liquid permeable, permitting liquid bodily exudates to readily penetrate through its thickness. A suitable topsheet (26) may be manufactured from a wide range of materials, such as porous foams, reticulated foams, apertured plastic films, woven materials, nonwoven materials, woven or nonwoven materials of natural fibers (e.g., wood or cotton fibers), synthetic fibers or filaments (e.g., polyester or polypropylene or bicomponent PE/PP fibers or mixtures thereof), or a combination of natural and synthetic fibers. The topsheet (26) may have one or more layers. The topsheet (26) may be apertured (FIG. 2, element 31), may have any suitable three-dimensional features, and/or may have a plurality of embossments (e.g., a bond pattern). The topsheet (26) may be apertured by overbonding a material and then rupturing the overbonds through ring rolling, such as disclosed in U.S. Pat. No. 5,628,097 and in U.S. Pat. Appl. Pub. No. US 2016/0136014. Any portion of the topsheet (26) may be coated with a skin care composition, an antibacterial agent, a surfactant, and/or other beneficial agents. The topsheet (26) may be hydrophilic or hydrophobic or may have hydrophilic and/or hydrophobic portions or layers. If the topsheet (26) is hydrophobic, typically apertures will be present so that bodily exudates may pass through the topsheet (26).

Backsheet

The backsheet (28) is generally that portion of the absorbent article (10) positioned proximate to the garment-facing surface (2) of the absorbent core (30). The backsheet (28) may be joined to portions of the topsheet (26), the outer cover material (40), the absorbent core (30), and/or any other layers of the absorbent article (10) by any attachment methods known to those of ordinary skill in the art. The backsheet (28) prevents, or at least inhibits, the bodily exudates absorbed and contained in the absorbent core (30) from soiling articles such as bedsheets, undergarments, and/or clothing. The backsheet (28) is typically liquid impermeable, or at least substantially liquid impermeable. The backsheet (28) may, for example, be or comprise a thin plastic film, such as a thermoplastic film having a thickness of about 0.012 mm to about 0.051 mm. Other suitable backsheet (28) materials may include breathable materials which permit vapors to escape from the absorbent article (10), while still preventing, or at least inhibiting, bodily exudates from passing through the backsheet (28).

Outer Cover Material

The outer cover material (40) (sometimes referred to as a backsheet nonwoven) may comprise one or more nonwoven materials joined to the backsheet (28) and that cover the backsheet (28). The outer cover material (40) forms at least a portion of the garment-facing surface (2) of the absorbent article (10) and effectively "covers" the backsheet (28) so that film is not present on the garment-facing surface (2). The outer cover material (40) may comprise a bond pattern, apertures, and/or three-dimensional features. The outer cover material (40) may be a hydroentangled nonwoven material.

Absorbent Core

Figure 9:
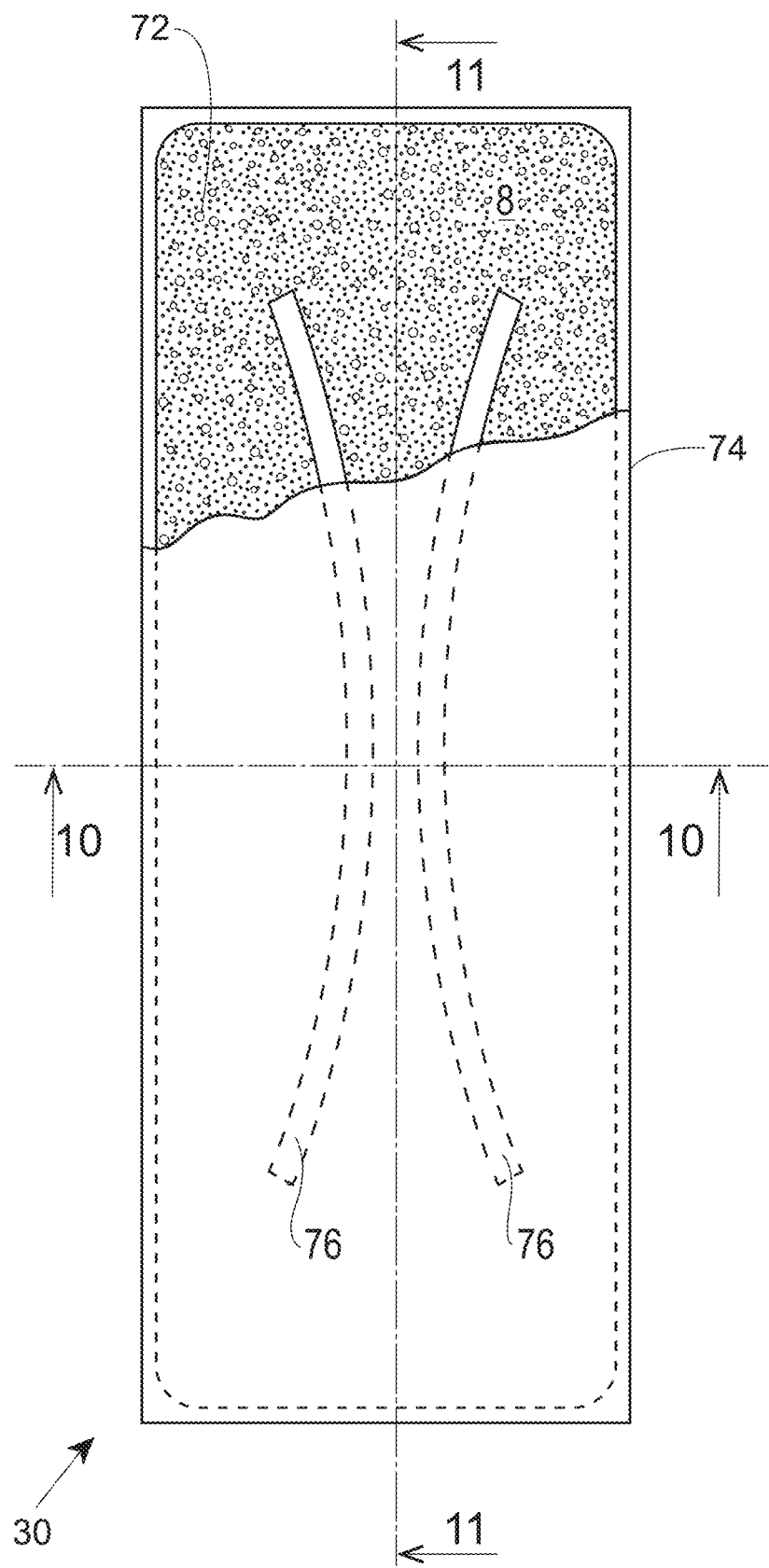
FIG. 9 is a plan view of an example absorbent core of an absorbent article.
Figure 10:
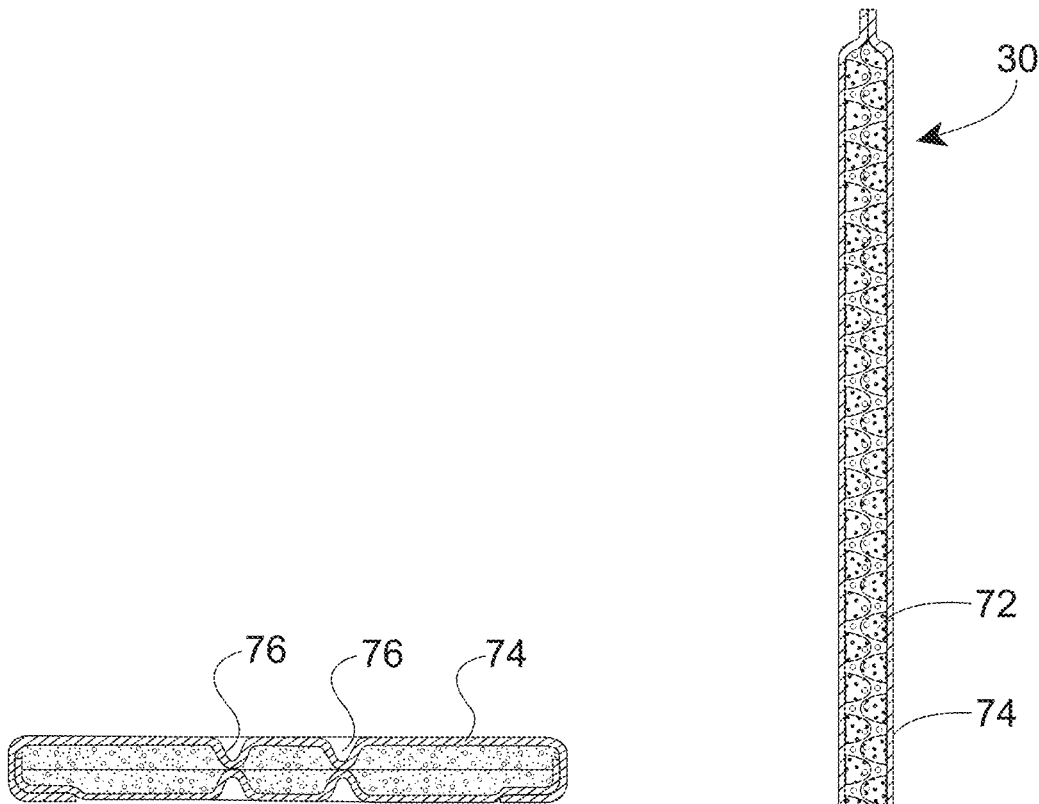
FIG. 10 is a cross-sectional view, taken about line 10-10, of the absorbent core of FIG. 9.
Figure 11:
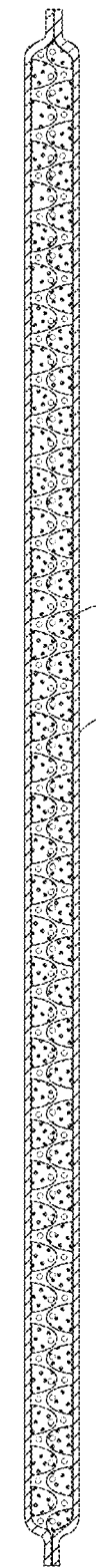
FIG. 11 is a cross-sectional view, taken about line 11-11, of the absorbent core of FIG. 10.

As used herein, the term "absorbent core" (30) refers to a component of the absorbent article (10) disposed therein for absorbing and containing liquid such as urine received by the absorbent article (10). The absorbent core (30) thus typically has a high absorbent capacity. An example absorbent core (30) is schematically shown in FIGS. 9 through 11. The absorbent core (30) comprises an absorbent material (72) that is typically enclosed within or sandwiched between a core wrap (74).

The core wrap (74) may be a single material that is folded and attached to itself, or it may comprise a separate top layer and bottom layer that may be bonded or otherwise joined together. The absorbent material (72) typically comprises superabsorbent particles which are optionally mixed with cellulose fibers. As used herein, "absorbent core" does not include any acquisition material (38), topsheet (26), or backsheet (28) of the absorbent article (10).

The example absorbent core (30) shown in isolation in FIGS. 9 through 11 is in the dry state (before use). The absorbent core (30) may typically have a generally rectangular shape as defined by its longitudinal edges and transversal front edge and back edge or may have other shapes.

Absorbent material (72) may be deposited as a layer having a generally rectangular outline, as represented in FIG. 9. The layer of absorbent material (72) may also have a non-rectangular perimeter ("shaped" core), in particular, the layer of absorbent material (72) may define a tapering along its width towards the central region of the core (or "dog-bone" shape). In this way, the absorbent material (72) deposition area may have a relatively narrow width in an area of the absorbent core (30) intended to be placed in the crotch region (14) of the absorbent article (10). This may provide, for example, better wearing comfort. Other shapes can also be used such as a "T" or "Y" or "hourglass" for the area of the absorbent material (72).

The absorbent material (72) may be any conventional absorbent material known in the art. For example, the absorbent material (72) may comprise a blend of cellulose fibers and superabsorbent polymers ("SAP"), typically with the percentage of SAP ranging from about 50% to about 75% by weight of the absorbent material (72). The absorbent material (72) may also be free of cellulose fibers, as is known in so-called airfelt-free cores, where the absorbent material (72) consists essentially of or consists of SAP. The absorbent material (72) may also be a high internal phase emulsion foam.

"Superabsorbent polymers" or "SAP" refers herein to absorbent materials, typically cross-linked polymeric materials, that can absorb at least ten times their weight of an aqueous 0.9% saline solution as measured using the Centrifuge Retention Capacity (CRC) test (EDANA method WSP 241.2.R3 (12)). The SAP may have a CRC value of at least 20 g/g, in particular of from 20 g/g to 40 g/g. "Superabsorbent polymer particles," as used herein, refers to a superabsorbent polymer material which is in particulate form so as to be flowable in the dry state.

Various absorbent core (30) designs comprising high amounts of SAP have been proposed in the past, see for example in U.S. Pat. No. 5,599,335, EP1,447,066, WO95/11652, U.S. Pat. Appl. Pub. No. 2008/0312622A1, and WO2012/052172. In particular, the SAP printing technology as disclosed in U.S. Pat. Appl. Pub. No. 2006/024433, U.S. Pat. Appl. Pub. No. 2008/0312617, and U.S. Pat. Appl. Pub. No. 2010/0051166A1 (both to Hundorf et al.) may be used. The present disclosure however is not limited to a particular type of absorbent core (30). The absorbent core (30) may also comprise one or more glues such as an auxiliary glue applied between the internal surface of one (or both) of the core wrap (74) layers and the absorbent material (72) to reduce leakage of SAP outside of the core wrap (74). A micro-fibrous adhesive net may also be used in airfelt-free cores as described in the above Hundorf references. These glues are not represented in the Figures for simplicity. Other absorbent core (30) constructions comprising a high loft nonwoven substrate, such as a carded nonwoven layer having a porous structure into which SAP particles have been deposited, may also be used in the present disclosure.

The absorbent material (72) may be deposited as a continuous layer within the core wrap (74). The absorbent material (72) may also be present discontinuously, for example, as individual pockets or stripes of absorbent material (72) enclosed within the core wrap (74) and separated from each other by material-free junction areas. A continuous layer of absorbent material (72), in particular SAP, may also be obtained by combining two absorbent material (72) layers having matching discontinuous absorbent material (72) application patterns, wherein the resulting layer is substantially continuously distributed across the SAP area, as illustrated in FIGS. 10 through 11. As for example taught in U.S. Pat. Appl. Pub. No. 2008/312,622A1, each absorbent material (72) layer may thus comprise a pattern having absorbent material land areas and absorbent material-free junction areas, wherein the absorbent material land areas of the first layer correspond substantially to the absorbent material-free junction areas of the second layer and vice versa.

The basis weight (amount deposited per unit of surface) of the absorbent material (72) may also be varied to create a profiled distribution of absorbent material (72), in particular in the longitudinal direction to provide more absorbency towards the center and the middle of the absorbent core (30), but also in the transversal direction, or both directions of the absorbent core (30). The absorbent core (30) may also comprise one or more longitudinally (or otherwise) extending channels (76), which are areas of the absorbent material (72) layer substantially free of absorbent material (72) within the absorbent material (72) layer. The top side of the core wrap (74) may be advantageously bonded to the bottom side of the absorbent core (30) by adhesive, mechanical or ultra-sonic bonding through these material-free areas. Example disclosures of such channels in an airfelt-free core can be found in WO2012/170778 and US2012/0312491. Channels may of course also be formed in absorbent cores (30) comprising a mix of cellulose fibers and SAP particles. These channels may embody any suitable shapes and any suitable number of channels may be provided. In other instances, the absorbent core (30) may be embossed to create the impression of channels. The absorbent core (30) in FIGS. 9 through 11 is merely an example absorbent core (30). Many other absorbent cores (30) with or without channels are also within the scope of the present disclosure.

Barrier Leg Cuffs/Leg Elastics

Referring to FIGS. 1 and 2, for example, the absorbent article (10) may comprise one or more pairs of barrier leg cuffs (32) and one or more pairs of leg elastics (34). The barrier leg cuffs (32) may be positioned laterally inboard of leg elastics (34). Each barrier leg cuff (32) may be formed by a piece of material which is bonded to the absorbent article (10) so it can extend upwards from a wearer-facing surface (4) of the absorbent article (10) and provide improved containment of bodily exudates approximately at the junction of the torso and legs of the wearer. The barrier leg cuffs (32) are delimited by a proximal edge joined directly or indirectly to the topsheet (26) and/or the backsheet (28) and a free terminal edge, which is intended to contact and form a seal with the wearer's skin. The barrier leg cuffs (32) may extend at least partially between the front end edge (18) and the back end edge (20) of the absorbent article (10) on opposite sides of the central longitudinal axis (50) and may be at least present in the crotch region (14). The barrier leg cuffs (32) may each comprise one or more elastics (33) (e.g., elastic strands or strips) near or at the free terminal edge. These elastics (33) cause the barrier leg cuffs (32) to help form a seal around the legs and torso of a wearer. The leg elastics (34) extend at least partially between the front end edge (18) and the back end edge (20). The leg elastics (34) essentially cause portions of the absorbent article (10) proximate to the chassis side edges (22 and 24) to help form a seal around the legs of the wearer. The leg elastics (34) may extend at least within the crotch region (14).

Elastic Waistband

Referring to FIGS. 1 and 2, the absorbent article (10) may comprise one or more elastic waistbands (36). The elastic waistbands (36) may be positioned on the garment-facing surface (2) or the wearer-facing surface (4). As an example, a first elastic waistband (36) may be present in the front waist region (12) near the front belt end edge (18) and a second elastic waistband (36) may be present in the back waist region (16) near the back end edge (20). The elastic waistbands (36) may aid in sealing the absorbent article (10) around a waist of a wearer and at least inhibiting bodily exudates from escaping the absorbent article (10) through the waist opening circumference (62). In some instances, an elastic waistband (36) may fully surround the waist opening circumference (62) of an absorbent article (10).

Acquisition Materials

Referring to FIGS. 1, 2, 7, and 8, one or more acquisition materials (38) may be present at least partially intermediate the topsheet (26) and the absorbent core (30). The acquisition materials (38) are typically hydrophilic materials that provide significant wicking of bodily exudates. These acquisition materials (38) may dewater the topsheet (26) and quickly move bodily exudates into the absorbent core (30). The acquisition materials (38) may comprise one or more nonwoven materials, foams, formed films, apertured formed films, cellulosic materials, cross-linked cellulosic materials, air laid cellulosic nonwoven materials, spunlace materials, or combinations thereof, for example. In some instances, portions of the acquisition materials (38) may extend through portions of the topsheet (26), portions of the topsheet (26) may extend through portions of the acquisition materials (38), and/or the topsheet (26) may be nested with the acquisition materials (38). Typically, an acquisition material (38) may have a width and length that are smaller than the width and length of the topsheet (26). The acquisition material (38) may be a secondary topsheet in the feminine pad context. The acquisition material (38) may have one or more channels as described above with reference to the absorbent core (30) (including the embossed version). The channels in the acquisition material (38) may align or not align with channels in the absorbent core (30). In an example, a first acquisition material (38) may comprise a nonwoven material and a second acquisition material (38) may comprise a cross-linked cellulosic material.

Landing Zone Area

Referring to FIGS. 1 and 2, the absorbent article (10) may have a landing zone area (44) that is formed in a portion of the garment-facing surface (2) of the outer cover material (40). The landing zone area (44) may be in the back waist region (16) if the absorbent article (10) fastens from front to back or may be in the front waist region (12) if the absorbent article (10) fastens from back to front. In some instances, the landing zone area (44) may be or may comprise one or more discrete nonwoven materials that are attached to a portion of the outer cover material (40) in the front waist region (12) or the back waist region (16) depending upon whether the absorbent article (10) fastens in the front or the back. In essence, the landing zone area (44) is configured to receive the fasteners (46) and may comprise, for example, a plurality of loops configured to be engaged with a plurality of hooks on the fasteners (46), or vice versa.

Graphics

Referring to FIG. 1, the absorbent articles (10) of the present disclosure may comprise one or more graphics (78) that are visible from the garment-facing surface (2). The graphics (78) may be printed on the landing zone area (44), the backsheet (28), and/or at other locations. The graphics (78) may coordinate with other elements of the absorbent article (10), such as bond patterns, wetness indicator(s) (80), aperture patterns, and the like.

As to particular embodiments, the wetness indicator (80) may coordinate with graphics (78). For example, the wetness indicator (80) may appear or disappear and create/remove a character in coordination with graphics (78). In other instances, the wetness indicator (80) may not coordinate with graphics (78). In yet other instances, the absorbent article (10) may be free of graphics (78). As to particular embodiments, the wetness indicator (80) may comprise, consist essentially of, or consist of the present composition. Graphics (78) may be formed from inks, pigments, colorants, and the like other than the present composition.

Figure 13:
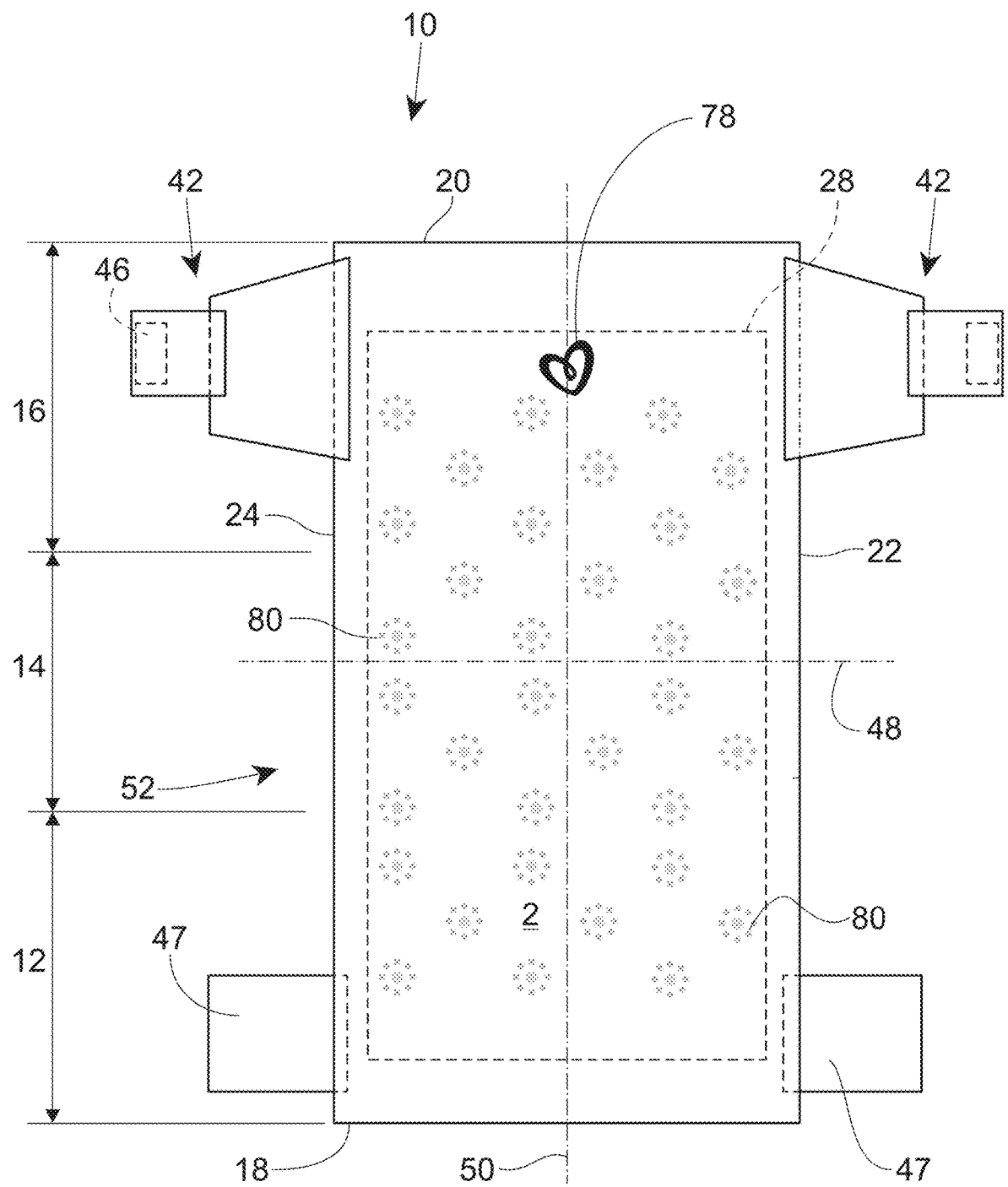
FIG. 13 is a plan view of an example absorbent article in the form of a taped diaper, garment-facing surface facing the viewer, in a flat laid-out state.
Figure 14:
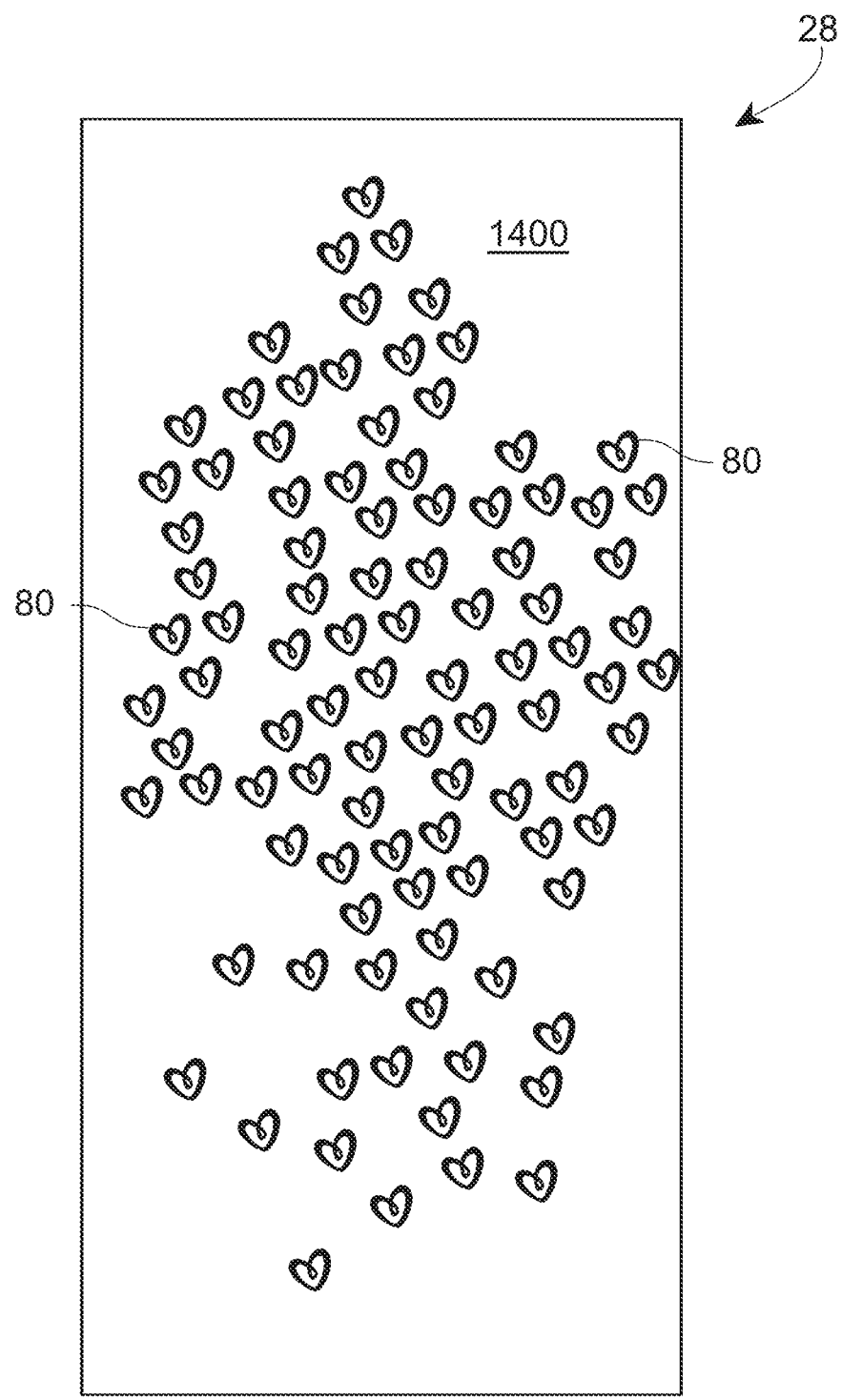
FIG. 14 is a plan view of an example backsheet of an absorbent article, wearer-facing surface facing the viewer.
Figure 15:
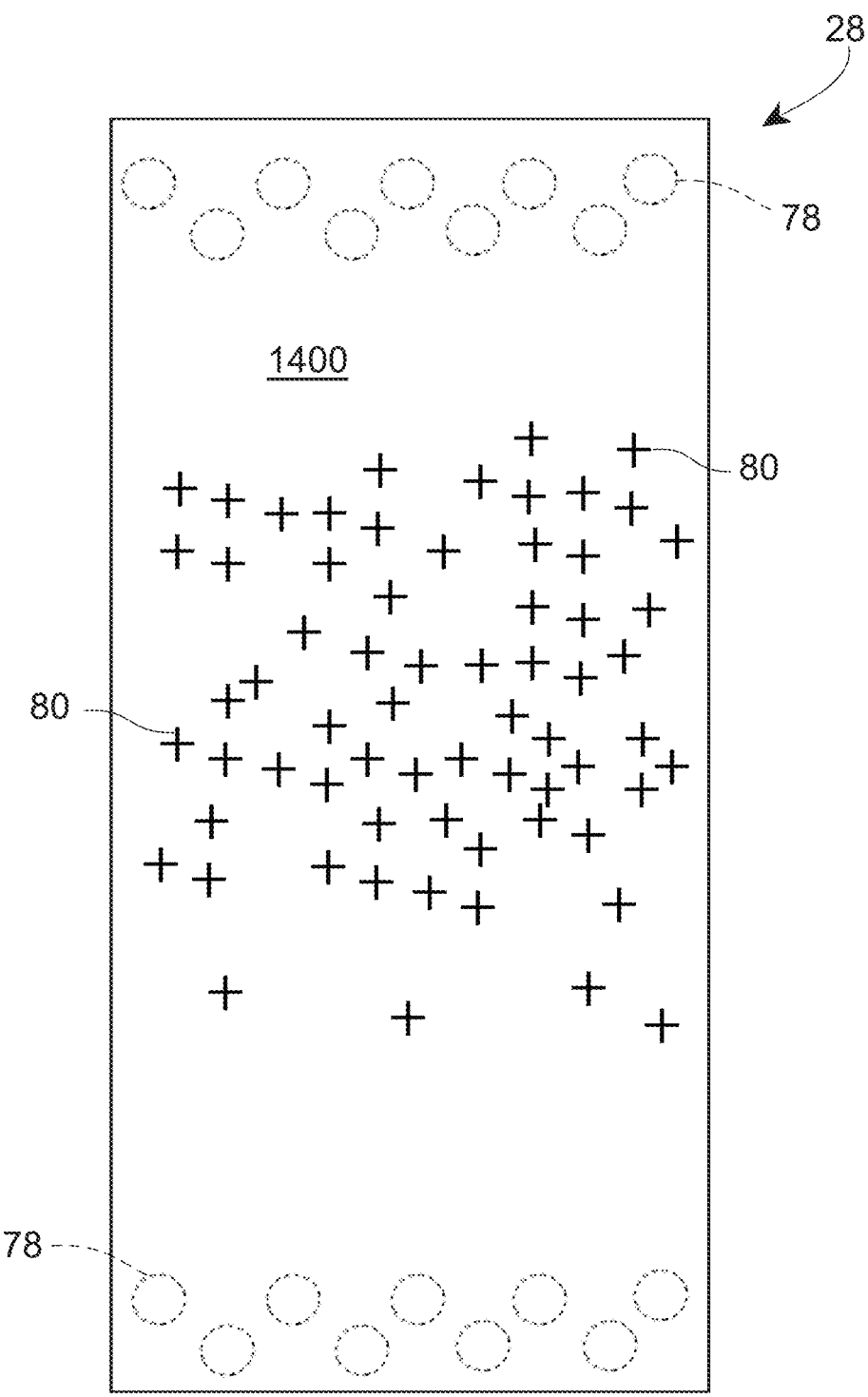
FIG. 15 is a plan view of an example backsheet of an absorbent article containing a first plurality of graphics and a second plurality of graphics, wearer-facing surface facing the viewer.

As discussed herein, the present composition may be disposed on a component of the absorbent article (10) in a plurality of discrete graphics, as shown for example in FIGS. 13, 14, and 15. As shown in FIG. 14, the wetness indicator (80) may be disposed as a first plurality of discrete graphics on a first surface (1400) of the backsheet (28). As shown in FIG. 15, graphics (78) may be disposed as a second plurality of discrete graphics on a second surface of the backsheet (28). As shown in FIG. 13, the wetness indicator (80) and graphics (78) may be disposed on the same surface of the backsheet (28), for example a wearer-facing surface (4). As to particular embodiments, the first plurality of discrete graphics comprising the wetness indicator (80) may not overlap the second plurality of discrete graphics (78).

Front and Back Ears

Referring to FIGS. 1 and 2, as referenced above, the absorbent article (10) may have front and/or back ears (47 and 42) in a taped diaper context. Only one set of ears (42 and 47) may be required in most taped diapers. The single set of ears (42 and 47) may comprise fasteners (46) configured to engage the landing zone area (44). If two sets of ears (42 and 47) are provided, in most instances, only one set of the ears (42 and 47) may have fasteners (46), with the other set being free of fasteners. The ears (42 and 47), or portions thereof, may be elastic or may have elastic panels. In an example, an elastic film or elastic strands may be positioned intermediate a first nonwoven material and a second nonwoven material. The elastic film may or may not be apertured. The ears (42 and 47) may be shaped. The ears (42 and 47) may be integral (e.g., extension of the outer cover material (40), the backsheet (28), and/or the topsheet (26)) or may be discrete components attached to a chassis (52) of the absorbent article (10) on a wearer-facing surface (4), on a garment-facing surface (2), or intermediate the two surfaces (4 and 2).

Masking Layer

One or more masking layers or materials may be provided in the absorbent articles (10). A masking layer may be a layer that provides a cushiony feel when the absorbent article (10) is touched from the garment-facing surface (2) or the wearer-facing surface (4). The masking layer may "mask" a grainy feel potentially caused by the absorbent material (72), such as SAP. The masking layer may "mask" bodily exudates from being visible when viewing the wearer-facing surface (4) or the garment-facing surface (2) of the absorbent article (10). The masking layer may have a basis weight in the range of about 15 gsm to about 50 gsm or about 15 gsm to about 40 gsm. The masking layer may comprise one or more nonwoven materials (e.g., a hydroentangled nonwoven material), foams, pulp layers, and/or other suitable materials. The masking layer may be the outer cover material (40). The masking layer may be the layer forming the garment-facing surface (2) or the wearer-facing surface (4) of the core wrap (74). The masking layer may be a separate material positioned intermediate the garment-facing surface (2) of the core wrap (74) and the liquid impermeable backsheet (28).

Loading Levels

As to particular embodiments, the present absorbent article (10) can be configured to allow urine to contact the composition in certain regions of the absorbent article (10) at various loading levels. For example, the absorbent article (10) can be configured to allow urine to contact the composition in the crotch region (14) on the first urination, but contact the composition in other regions of the absorbent article (10) only after the amount of urine in the absorbent article (10) reaches a predetermined threshold value. For example, the absorbent core (30) may have limited ability to distribute urine from a given region of the absorbent article (10) until it contains sufficient urine to activate a composition in this region, thereby preventing activation of the composition in adjacent regions of the absorbent article (10) until the overall urine loading in the absorbent article (10) increases above a given level. As the total urine loading in the absorbent article (10) increases, more regions of the absorbent article (10) will contain sufficient urine to activate compositions that may be located in those regions.

Sensors

Referring again to FIG. 1, the absorbent articles (10) of the present disclosure may comprise a sensor system (82) for monitoring changes within the absorbent article (10). The sensor system (82) may be discrete from or integral with the absorbent article (10). The absorbent article (10) may comprise sensors that can sense various aspects of the absorbent article (10) associated with insults of bodily exudates such as urine and/or BM (e.g., the sensor system (82) may sense variations in temperature, humidity, presence of ammonia or urea, various vapor components of the exudates (urine and feces), changes in moisture vapor transmission through the absorbent article's garment-facing surface (2), changes in translucence of the garment-facing surface (2), and/or color changes through the garment-facing surface (2)). Additionally, the sensor system (82) may sense components of urine, such as ammonia or urea and/or byproducts resulting from reactions of these components with the absorbent article (10). The sensor system (82) may sense byproducts that are produced when urine mixes with other components of the absorbent article (10) (e.g., adhesives, agm). The components or byproducts being sensed may be present as vapors that may pass through the garment-facing surface (2). It may also be desirable to place reactants in the absorbent article (10) that change state (e.g., color, temperature) or create a measurable byproduct when mixed with urine or BM. The sensor system (82) may also sense changes in pH, pressure, odor, the presence of gas, blood, a chemical marker or a biological marker, or combinations thereof. The sensor system (82) may have a component on or proximate to the absorbent article (10) that transmits a signal to a receiver more distal from the absorbent article (10), such as an iPhone, for example. The receiver may output a result to communicate to the caregiver a condition of the absorbent article (10). In other instances, a receiver may not be provided, but instead the condition of the absorbent article (10) may be visually or audibly apparent from the sensor on the absorbent article (10).

Packages

The absorbent articles (10) of the present disclosure may be placed into packages. The packages may comprise polymeric films and/or other materials. Graphics and/or indicia relating to properties of the absorbent articles (10) may be formed on, printed on, positioned on, and/or placed on outer portions of the packages. Each package may comprise a plurality of absorbent articles (10). The absorbent articles (10) may be packed under compression so as to reduce the size of the packages, while still providing an adequate number of absorbent articles (10) per package. By packaging the absorbent articles (10) under compression, caregivers can easily handle and store the packages, while also providing distribution savings to manufacturers owing to the size of the packages.

Arrays

"Array" means a display of packages comprising disposable absorbent articles (10) of different article constructions (e.g., different elastomeric materials (compositionally and/or structurally) in the side panels, side flaps and/or belts flaps, different graphic elements, different product structures, fasteners, or lack thereof). The packages may have the same brand and/or sub-brand and/or the same trademark registration and/or having been manufactured by or from a common manufacturer and the packages may be available at a common point of sale (e.g., oriented in proximity to each other in a given area of a retail store). An array is marketed as a line-up of products normally having like packaging elements (e.g., packaging material type, film, paper, dominant color, design theme, etc.) that convey to consumers that the different individual packages are part of a larger line-up. Arrays often have the same brand, for example, "Huggies," and same sub-brand, for example, "Pull-Ups." A different product in the array may have the same brand "Huggies" and the sub-brand "Little Movers." The differences between the "Pull-Ups" product in the array and the "Little Movers" product in the array may include product form, application style, different fastening designs, or other structural elements intended to address the differences in physiological or psychological development. Furthermore, the packaging is distinctly different in that "Pull-Ups" is packaged in a predominately blue or pink film bag and "Little Movers" is packaged in a predominately red film bag.

Further regarding "arrays," as another example an array may be formed by different products having different product forms manufactured by the same manufacturer, for example, "Kimberly-Clark," and bearing a common trademark registration; for example, one product may have the brand name "Huggies," and sub-brand, for example, "Pull-Ups." A different product in the array may have a brand/sub-brand "Good Nites" and both are registered trademarks of The Kimberly-Clark Corporation and/or are manufactured by Kimberly-Clark. Arrays also often have the same trademarks, including trademarks of the brand, sub-brand, and/or features and/or benefits across the line-up. "On-line Array" means an "array" distributed by a common on-line source.

Sanitary Napkin

Figure 12:
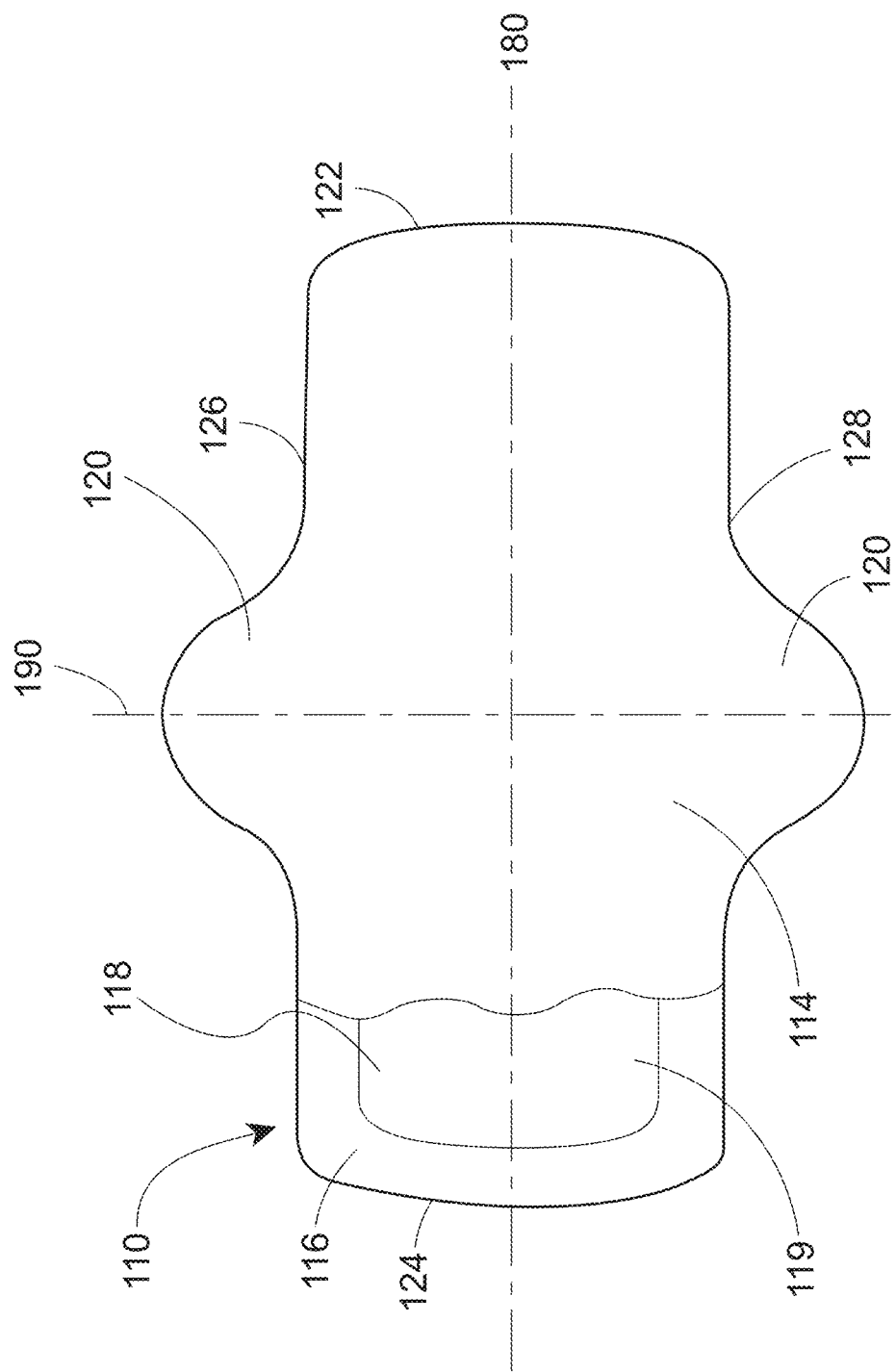
FIG. 12 is a plan view of an example absorbent article in the form of a sanitary napkin.

Referring to FIG. 12, an absorbent article (10) of the present disclosure may be a sanitary napkin (110). The sanitary napkin (110) may comprise a liquid permeable topsheet (114), a liquid impermeable, or substantially liquid impermeable, backsheet (116), and an absorbent core (118). The liquid impermeable backsheet (116) may or may not be vapor permeable. The absorbent core (118) may have any or all of the features described herein with respect to the absorbent core (30) and, in some forms, may have a secondary topsheet (119) (STS) instead of the acquisition materials (38) disclosed above. The STS (119) may comprise one or more channels, as described above (including the embossed version). In some forms, channels in the STS (119) may be aligned with channels in the absorbent core (118). The sanitary napkin (110) may also comprise wings (120) extending outwardly with respect to a longitudinal axis (180) of the sanitary napkin (110). The sanitary napkin (110) may also comprise a lateral axis (190). The wings (120) may be joined to the topsheet (114), the backsheet (116), and/or the absorbent core (118). The sanitary napkin (110) may also comprise a front edge (122), a back edge (124) longitudinally opposing the front edge (122), a first side edge (126), and a second side edge (128) longitudinally opposing the first side edge (126). The longitudinal axis (180) may extend from a midpoint of the front edge (122) to a midpoint of the back edge (124). The lateral axis (190) may extend from a midpoint of the first side edge (126) to a midpoint of the second side edge (128). The sanitary napkin (110) may also be provided with additional features commonly found in sanitary napkins as is known in the art.

Bio-Based Content for Components

Components of the absorbent articles (10) described herein may at least partially be comprised of bio-based content as described in U.S. Pat. Appl. No. 2007/0219521A1. For example, the SAP component may be bio-based via their derivation from bio-based acrylic acid. Bio-based acrylic acid and methods of production are further described in U.S. Pat. Appl. Pub. No. 2007/0219521 and U.S. Pat. Nos. 8,703,450, 9,630,901, and 9,822,197. Other components, for example nonwoven and film components, may comprise bio-based polyolefin materials. Bio-based polyolefins are further discussed in U.S. Pat. Appl. Pub. Nos. 2011/0139657, 2011/0139658, 2011/0152812, and 2016/0206774, and U.S. Pat. No. 9,169,366. Example bio-based polyolefins for use in the present disclosure comprise polymers available under the designations SHA7260™, SHE150™, or SGM9450F™ (all available from Braskem S.A.).

An absorbent article (10) component may comprise a bio-based content value from about 10% to about 100%, from about 25% to about 100%, from about 40% to about 100%, from about 50% to about 100%, from about 75% to about 100%, or from about 90% to about 100%, for example, using ASTM D6866-10, method B.

Recycle Friendly and Bio-Based Absorbent Articles

Components of the absorbent articles (10) described herein may be recycled for other uses, whether they are formed, at least in part, from recyclable materials. Examples of absorbent article (10) materials that may be recycled are nonwovens, films, fluff pulp, and SAP. The recycling process may use an autoclave for sterilizing the absorbent articles (10), after which the absorbent articles (10) may be shredded and separated into different byproduct streams. Example byproduct streams may comprise plastic, SAP, and cellulose fiber, such as pulp. These byproduct streams may be used in the production of fertilizers, plastic articles of manufacture, paper products, viscose, construction materials, absorbent pads for pets or on hospital beds, and/or for other uses. Further details regarding absorbent articles (10) that aid in recycling, designs of recycle friendly diapers, and designs of recycle friendly and bio-based component diapers, are disclosed in U.S. Pat. Appl. Pub. No. 2019/0192723.

Methods of Making Absorbent Articles Having a Composition for Wetness Indication The present composition and a substrate which may be incorporated into an absorbent article (10) or a component thereof can be provided. The composition can then be applied to the substrate by a printing process.

The present composition can be applied to the substrate at a transfer rate of between about 1 BCM/in$^2$ and about 10 BCM/in$^2$, between about 2 BCM/in$^2$ and about 8 BCM/in$^2$, or between about 3 BCM/in$^2$ and about 10 BCM/in$^2$. The application rate of the composition can result in a finished absorbent article (10) comprising no more than 50 mg, no more than 35 mg, no more than 25 mg, no more than 15 mg, or no more than 10 mg of the composition per absorbent article (10).

After application of the composition to the substrate, at least a portion of the solvent may be allowed to evaporate prior to incorporating the substrate into an absorbent article (10).

As to particular embodiments, the present composition may be applied directly to at least one surface of a component of the absorbent article (10), such as the backsheet (28), by any of the printing processes disclosed herein. It may be desirable for the printing process to deliver enough ink over a specific area to achieve a minimal ink optical density measure as observed from the garment-facing surface (2) of the absorbent article (10). The optical density measure can be obtained via any of a variety of suitable optical measuring devices, such as a spectrophotometer; one such example of a suitable spectrophotometer can be the eXact™ spectrophotometer manufactured by X-RITE, Incorporated. Optical density (OD) is a unitless measure of color saturation over a specified viewing area of the spectrophotometer lens. It can be summarized as the color intensity of a specified amount of a composition within a specified application area. For instance, if within a 25 mm$^2$ area there is 10 mg of a composition, that would correspond to an OD of x. If in that same 25 mm$^2$ area there is 25 mg of a composition of the same color and shape, the OD would correspond to a value of y, where y>x numerically.

In the case of absorbent articles (10) comprising the present composition where the total amount of printable composition per absorbent article (10) is not greater than about 50 mg, not greater than about 30 mg, or not greater than about 10 mg, the optical density of the discrete graphics printed with the composition may be >0.4, or >0.5, or >0.8 as measured from the garment-facing surface (2) of the absorbent article (10). The higher the optical density value, the greater the intensity of color that is detectable by the observer, whereas, if the same total amount of printable composition were spread out over a larger coverage area, the optical density would be lower. The optical density of at least some of the plurality of discrete graphics printed with the present composition may be >0.4, or >0.5, or >0.8 as measured from the garment-facing surface (2) of the absorbent article (10) when the composition is in the second state.

Various non-limiting forms of the present invention are herein described to provide an overall understanding of the principles of the structure, function, manufacture, and use of the composition and, as to particular embodiments, corresponding absorbent articles (10) disclosed herein. One or more examples of these non-limiting forms are illustrated in the accompanying drawings. Those of ordinary skill in the art will understand that the compositions and, as to particular embodiments, corresponding absorbent articles (10), and methods for manufacture described herein and illustrated in the accompanying drawings are non-limiting example forms. The features illustrated or described in connection with one non-limiting form may be combined with the features of other non-limiting forms. Such modifications and variations are intended to be included within the scope of the present disclosure.

As can be easily understood from the foregoing, the basic concepts of the present invention may be embodied in a variety of ways. The invention involves numerous and varied embodiments of a composition and methods for making and using such a composition.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "indicator" should be understood to encompass disclosure of the act of "indicating"—whether explicitly discussed or not—and, conversely, were there effectively disclosure of the act of "indicating", such a disclosure should be understood to encompass disclosure of an "indicator" and even a "means for indicating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially" it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the compositions herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this present disclosure.

We claim:

1. A composition comprising:
    a colorant which undergoes a visible color change upon exposure to an aqueous medium having a pH above the $pK_a$ of said colorant;
    a leaching inhibitor having a cationic charge; and
    a pH below the $pK_a$ of said colorant;
    wherein a molar ratio of said leaching inhibitor:said colorant is not greater than about 30:1;
    wherein said composition is in a liquid state at room temperature;
    wherein upon application to a substrate, said composition comprises a non-activated state in which said colorant has a neutral charge and is in a first color state associated therewith;
    wherein upon exposure to said aqueous medium, said composition comprises an activated state in which said colorant is anionic and in a second color state associated therewith; and
    wherein upon exposure to said aqueous medium, said colorant having said anionic charge resists leaching from said substrate by being chemically bound to said leaching inhibitor having said cationic charge.

2. The composition of claim 1, said colorant and said leaching inhibitor formulated into a printable ink formulation configured for printing on said substrate.

3. The composition of claim 2, said printable ink formulation further comprising a volatile solvent;
    wherein at least a portion of said volatile solvent evaporates upon said printing.

4. The composition of claim 2, said printable ink formulation comprising a viscosity in a range of between about 25 cP and about 125 cP.

5. The composition of claim 2, said printable ink formulation further comprising a viscosity increaser;
wherein said viscosity increaser comprises silica.

6. The composition of claim 5, wherein said viscosity increaser comprises fumed silica.

7. The composition of claim 2, said printable ink formulation further comprising a resin which facilitates adhesion of said colorant to said substrate.

8. The composition of claim 1, wherein said colorant comprises a pH-sensitive colorant.

9. The composition of claim 1, wherein said leaching inhibitor comprises a quaternary ammonium compound.

10. The composition of claim 1, wherein said aqueous medium comprises urine.

11. A method for visually determining whether a composition has been exposed to a wetness threshold, comprising:
visually observing said composition comprising:
a colorant which undergoes a visible color change upon exposure to an aqueous medium having a pH above the $pK_a$ of said colorant;
a leaching inhibitor having a cationic charge; and
a pH below the $pK_a$ of said colorant;
wherein a molar ratio of said leaching inhibitor:said colorant is not greater than about 30:1;
wherein said composition is in a liquid state at room temperature;
wherein upon application to a substrate, said composition comprises a non-activated state in which said colorant has a neutral charge and is in a first color state associated therewith;
wherein upon exposure to said aqueous medium, said composition comprises an activated state in which said colorant is anionic and in a second color state associated therewith; and
wherein upon exposure to said aqueous medium, said colorant having said anionic charge resists leaching from said substrate by being chemically bound to said leaching inhibitor having said cationic charge; and
wherein visual detection of said color change indicates that said composition was exposed to said wetness threshold.

12. The method of claim 11, wherein visual detection of the absence of said color change indicates that said composition was not exposed to said wetness threshold.

13. The method of claim 11, wherein said aqueous medium comprises urine.

14. A method of making a composition, comprising:
combining:
a colorant which undergoes a visible color change upon exposure to an aqueous medium having a pH above the $pK_a$ of said colorant; and
a leaching inhibitor having a cationic charge;
wherein a pH of said composition is below the $pK_a$ of said colorant;
wherein a molar ratio of said leaching inhibitor:said colorant is not greater than about 30:1;
wherein said composition is in a liquid state at room temperature;
wherein upon application to a substrate, said composition comprises a non-activated state in which said colorant has a neutral charge and is in a first color state associated therewith;
wherein upon exposure to said aqueous medium, said composition comprises an activated state in which said colorant is anionic and in a second color state associated therewith; and
wherein upon exposure to said aqueous medium, said colorant having said anionic charge resists leaching from said substrate by being chemically bound to said leaching inhibitor having said cationic charge.

15. The method of claim 14, further comprising formulating said colorant and said leaching inhibitor into a printable ink formulation configured for printing on said substrate.

16. The method of claim 15, further comprising combining a volatile solvent with said colorant and said leaching inhibitor;
wherein at least a portion of said volatile solvent evaporates upon said printing.

17. The method of claim 15, wherein said printable ink formulation comprises a viscosity in a range of between about 25 cP and about 125 cP.

18. The method of claim 15, further comprising combining a viscosity increaser with said colorant and said leaching inhibitor;
wherein said viscosity increaser comprises silica.

19. The method of claim 18, wherein said viscosity increaser comprises fumed silica.

20. The method of claim 15, further comprising combining a resin with said colorant and said leaching inhibitor;
wherein said resin facilitates adhesion of said colorant to said substrate.

21. The method of claim 14, wherein said colorant comprises a pH-sensitive colorant.

22. The method of claim 14, wherein said leaching inhibitor comprises a quaternary ammonium compound.

23. The method of claim 14, wherein said aqueous medium comprises urine.

* * * * *